(12) United States Patent
Molstad et al.

(10) Patent No.: US 7,038,871 B2
(45) Date of Patent: May 2, 2006

(54) MULTI-BAND SERVO PATTERNS WITH INHERENT TRACK ID

(75) Inventors: Richard W. Molstad, St. Paul, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 242 days.

(21) Appl. No.: 10/704,958

(22) Filed: Nov. 10, 2003

(65) Prior Publication Data

US 2005/0099713 A1 May 12, 2005

(51) Int. Cl.
G11B 5/09 (2006.01)

(52) U.S. Cl. .................................................. 360/48

(58) Field of Classification Search ................ 360/48, 360/51, 75, 76, 77.01, 77.12, 78.01, 77.03, 360/78.12; 370/231
See application file for complete search history.

(56) References Cited

U.S. PATENT DOCUMENTS

| | | | |
|---|---|---|---|
| 4,472,750 A * | 9/1984 | Klumpp et al. .......... 360/78.01 |
| 5,055,951 A * | 10/1991 | Behr ........................ 360/77.12 |
| 5,121,270 A * | 6/1992 | Alcudia et al. .......... 360/77.01 |
| 5,396,376 A * | 3/1995 | Chambors et al. ............ 360/48 |
| 5,629,813 A * | 5/1997 | Baca et al. ............... 360/77.12 |
| 5,689,384 A | 11/1997 | Albrecht et al. |
| 5,715,106 A * | 2/1998 | Kool et al. .................... 360/48 |
| 5,898,533 A | 4/1999 | Mantey et al. |
| 6,021,013 A | 2/2000 | Albrecht et al. |
| 6,023,385 A | 2/2000 | Gillingham et al. |
| 6,122,124 A * | 9/2000 | Fasen et al. .................... 360/51 |
| 6,124,996 A * | 9/2000 | Fasen et al. .................... 360/51 |
| 6,134,070 A * | 10/2000 | Tran et al. ..................... 360/75 |
| 6,141,174 A * | 10/2000 | Judge et al. ................... 360/76 |
| 6,172,837 B1 * | 1/2001 | Fasen .............................. 360/75 |
| 6,236,525 B1 * | 5/2001 | Cates et al. ..................... 360/51 |
| 6,241,674 B1 | 6/2001 | Phillips et al. |
| 6,271,786 B1 | 8/2001 | Huff et al. |
| 6,312,384 B1 | 11/2001 | Chiao |
| 6,363,107 B1 | 3/2002 | Scott |
| 6,381,261 B1 | 4/2002 | Nagazumi |
| 6,385,268 B1 | 5/2002 | Fleming et al. |
| 6,400,754 B1 | 6/2002 | Fleming et al. |
| 6,411,460 B1 * | 6/2002 | Fasen .......................... 360/75 |
| 6,462,904 B1 | 10/2002 | Albrecht et al. |
| 6,574,066 B1 * | 6/2003 | Stubbs et al. ............. 360/77.03 |
| 6,721,126 B1 * | 4/2004 | Bui et al. .................. 360/78.12 |
| 6,728,210 B1 * | 4/2004 | El-Khoury et al. ......... 370/231 |
| 6,754,016 B1 * | 6/2004 | Messner et al. .............. 360/48 |
| 2001/0053174 A1 | 12/2001 | Fleming et al. |
| 2002/0093640 A1 | 7/2002 | Watanabe et al. |

OTHER PUBLICATIONS

"Pulse Compression Recording," Dent III et al., *IEEE Transaction on Magnetics*, vol. MAG-12, No. 6, Nov. 1976, pp. 743-745.

* cited by examiner

*Primary Examiner*—David Hudspeth
*Assistant Examiner*—Fred F. Tzeng

(57) ABSTRACT

The invention is directed to patterns of amplitude-based servo windows that eliminate the need for conventional track identification marks, and various servo writing devices and head configurations that facilitate creation of such servo patterns. The patterns of servo windows may also eliminate the need for conventional synchronization marks. In accordance with the invention, the patterns of servo windows, themselves, can distinguish one track from another track in one or more servo bands and inherently provide synchronization without the need for synchronization marks between servo frames. In other words, the same amplitude-based servo windows that define the centerlines of the tracks can be arranged to provide track identification information and possibly inherent synchronization information.

23 Claims, 30 Drawing Sheets

MULTI-BAND SERVO PATTERNS WITH INHERENT TRACK ID

TECHNICAL FIELD

The invention relates to magnetic storage media and, more particularly, magnetic storage media recorded with amplitude-based servo patterns.

BACKGROUND

Data storage media are commonly used for storage and retrieval of data, and come in many forms, such as magnetic tape, magnetic disks, optical tape, optical disks, holographic disks or cards, and the like. Magnetic tape media remains economical for storing large amounts of data. For example, magnetic tape cartridges, or large spools of magnetic tape, are often used to back up data in large computing centers. Magnetic tape cartridges also find application in the backup of data stored on smaller computers such as desktop or notebook computers.

In magnetic media, data is typically stored as magnetic signals that are magnetically recorded on the medium surface. The data stored on the medium is typically organized along "data tracks," and transducer heads are positioned relative to the data tracks to write data to the tracks or read data from the tracks. A typical magnetic storage medium, such as magnetic tape, typically includes several data tracks. Optical media, holographic media and other media formats can also make use of data tracks.

Servo patterns refer to signals or other recorded marks on the medium that are used for tracking purposes. In other words, servo patterns are recorded on the medium to provide reference points relative to the data tracks. A servo controller interprets detected servo patterns and generates position error signals. The position error signals are used to adjust the lateral distance of the transducer head relative to the data tracks so that the transducer head is properly positioned along the data tracks for effective reading and/or writing of the data to the data tracks.

With some data storage media, such as magnetic tape, the servo patterns are stored in specialized tracks on the medium, called "servo tracks." Servo tracks serve as references for the servo controller. Servo tracks typically hold no data except for information that is useful to the servo controller to identify positioning of a transducer head relative to the surface of the medium. A plurality of servo tracks may be defined in a servo band. Some magnetic media include a plurality of servo bands, with data tracks being located between the servo bands.

The servo patterns recorded in the servo tracks may be sensed by one or more servo heads. For example, servo heads may be dedicated heads that read only servo patterns in the servo tracks. Alternatively, servo heads may be integrated with a read/write head. In any case, once a particular servo track is located by the servo head, one or more data tracks can be located on the medium according to the data track's known displacement from the servo track. The servo controller receives detected servo signals from the servo heads, and generates position error signals, which are used to adjust positioning of a read/write head relative to the data tracks.

Servo patterns are referred to as pre-recorded when they are recorded during the fabrication of the media. In other words, pre-recorded servo patterns are servo patterns recorded in the media prior to the media being used for storage of data. These pre-recorded servo patterns allow the media to achieve higher storage densities because the servo patterns enable positions on the media to be located with greater precision. Therefore, servo patterns allow for smaller amounts of media surface to be used to store units of data.

Amplitude-based servo patterns refer to servo patterns in which detection of the servo signal amplitude enables identification of head positioning relative to the medium. Amplitude-based servo patterns typically make use of amplitude-based servo windows which can be recorded or erased windows where a signal has been record or erased from the medium. As the head passes relative to the medium, signal amplitudes of detected servo signals can be used to determine whether the head is positioned correctly relative to a track on the medium. Amplitude-based servo patterns are commonly implemented in magnetic tape media, but may also be useful in other media.

SUMMARY

In general, the invention is directed to patterns of amplitude-based servo windows that eliminate the need for conventional track identification marks, and various servo writing devices and head configurations that facilitate creation of such servo patterns. The patterns of servo windows may also eliminate the need for conventional synchronization marks. In accordance with the invention, the patterns of servo windows, themselves, can distinguish one track from another track in one or more servo bands and inherently provide synchronization without the need for synchronization marks between servo frames. In other words, the same amplitude-based servo windows that define the centerlines of the tracks can be arranged to provide track identification information and possibly inherent synchronization information.

In one embodiment, the invention provides a data storage medium comprising a first servo band including a first set of amplitude-based servo windows, wherein the first set of amplitude-based servo windows defines a first set of servo tracks in the first servo band. The medium further includes a second servo band including a second set of amplitude-based servo windows, wherein the second set of amplitude-based servo windows defines a second set of servo tracks in the second servo band, and wherein the second set amplitude-based servo windows is arranged differently than the first set of amplitude-based servo windows.

In another embodiment, the invention provides a system comprising a data storage medium comprising a first servo band including a first set of amplitude-based servo windows, wherein the first set of amplitude-based servo windows defines a first set of servo tracks in the first servo band, and a second servo band including a second set amplitude-based servo windows, wherein the second set of amplitude-based servo windows define a second set of servo tracks in the second servo band, wherein the second set amplitude-based servo windows is arranged differently than the first set of amplitude-based servo windows. The system also includes a first head to pass relative to a given one of the servo tracks in the first servo band, a second head to pass relative to a corresponding one of the tracks in the second servo band, and a controller to determine whether the first and second heads are positioned on-track based on amplitudes of signals detected by the heads.

In another embodiment, the invention provides a method comprising recording a first set of amplitude-based servo windows on a magnetic medium to define a first servo band including a first set of servo tracks, and recording a second set of amplitude-based servo windows on a magnetic medium to define a second servo band including a second set of servo tracks, wherein the second set of amplitude-based servo windows is arranged differently than the first set of amplitude-based servo windows.

In another embodiment, the invention provides a method comprising detecting a first servo signal along a servo track of a first servo band based on amplitude-based servo windows in the first servo band, detecting a second servo signal along a corresponding servo track of a second servo band based on amplitude-based servo windows in the second servo band, and identifying the servo track based on the first and second servo signals.

In another embodiment, the invention provides a data storage medium comprising a servo band including a set of amplitude-based servo windows. The servo band includes a first servo track defined by a first subset of the amplitude-based servo windows positioned above and below a first centerline, a second servo track adjacent the first servo track, defined by a second subset of the amplitude-based servo windows positioned above and below a second centerline, and a third servo track adjacent the second servo track, defined by a third subset of the amplitude-based servo windows positioned above and below a third centerline. The amplitude-based servo windows are arranged such that output signals associated with the first and third servo tracks are unique relative to one another.

In another embodiment, the invention provides a data storage medium comprising a servo band including a set of amplitude-based servo windows, wherein set of the amplitude-based servo windows define a set of servo tracks in the servo band, wherein each track is defined by a centerline having one or more of the amplitude-based servo windows above the centerline and one or more of the amplitude-based servo windows below the centerline, and the set of amplitude-based servo windows is arranged in a stepped configuration in a direction perpendicular to the servo tracks.

In another embodiment, the invention provides a system comprising a data storage medium comprising a servo band including a set of amplitude-based servo windows, the servo band further including a first servo track defined by a first subset of the amplitude-based servo windows positioned above and below a first centerline, a second servo track adjacent the first servo track, defined by a second subset of the amplitude-based servo windows positioned above and below a second centerline, and a third servo track adjacent the second servo track, defined by a third subset of the amplitude-based servo windows positioned above and below a third centerline, wherein the amplitude-based servo windows are arranged such that output signals associated with the first and third servo tracks are unique relative to one another. The system also includes a head to pass relative to the medium along one of the tracks, and a controller to identify which of the tracks the head is passing based on signals detected by the head.

In another embodiment, the invention provides a method comprising recording a servo band on a magnetic medium, the servo band including a set of amplitude-based servo windows, the servo band further including a first servo track defined by a first subset of the amplitude-based servo windows positioned above and below a first centerline, a second servo track defined by a second subset of the amplitude-based servo windows positioned above and below a second centerline, and a third servo track defined by a third subset of the amplitude-based servo windows positioned above and below a third centerline, wherein the amplitude-based servo windows are arranged such that output signals associated with the first, second, and third servo tracks are unique relative to one another.

In another embodiment, the invention provides a method comprising recording a servo band on a magnetic medium, the servo band including a set of amplitude-based servo windows, wherein the set of the amplitude-based servo windows define a set of servo tracks in the servo band, and wherein each track is defined by a centerline having one or more of the amplitude-based servo windows above the centerline and one or more of the amplitude-based servo windows below the centerline, and the set of amplitude-based servo windows is arranged in a stepped configuration in a direction perpendicular to the servo tracks.

In another embodiment, the invention provides a data storage medium comprising a first servo track defining a first centerline, a first amplitude-based servo window above the first centerline, and a second amplitude-based servo window below the first centerline, wherein a width of the first amplitude-based servo window is different than a width of the second amplitude-based servo window. The medium also includes a second servo track defining a second centerline, wherein the second amplitude-based servo window is above the second centerline, a third amplitude-based servo window below the second centerline wherein a width of the second amplitude-based servo window is different than a width of the third amplitude-based servo window, a third servo track defining a third centerline, wherein the third amplitude-based servo window is above the third centerline, and a fourth amplitude-based servo window below the third centerline wherein a width of the forth amplitude-based servo window is different than a width of the third amplitude-based servo window, and wherein either the first and third amplitude-based servo windows or the second and fourth amplitude-based servo windows define different widths respectively.

In another embodiment, the invention provides a servo writing device comprising a first electromagnetic element to generate a magnetic field to record signal on a magnetic medium, a second electromagnetic element to selectively erase the signal, and a layer formed over the second electromagnetic element to define a set of gaps. The servo writing device also includes a controller to control the second electromagnetic element such that a magnetic field pattern is generated from the set of gaps for defined periods of time as the magnetic medium passes relative to the servo writing device such that amplitude-based servo windows are created on the medium by the set of gaps.

In another embodiment, the invention provides a servo writing device comprising an electromagnetic element to generate a magnetic field, and a layer formed over the electromagnetic element to define a first set of gaps that define a first magnetic field pattern corresponding to a first servo band on a magnetic medium and a second set of gaps that define a second magnetic field pattern corresponding to a second servo band on the magnetic medium.

In another embodiment, the invention provides servo writing device comprising a first electromagnetic element to generate a magnetic field to record signal on a magnetic medium, a second electromagnetic element to selectively erase the signal, and a layer formed over the second electromagnetic element to define a first set of gaps that define a first pattern corresponding to a first servo band on a magnetic medium and a second set of gaps that define a second pattern corresponding to a second servo band on the magnetic medium.

In another embodiment, the invention provides a servo writing device comprising an electromagnetic element to generate a magnetic field, and a layer formed over the electromagnetic element to define a set of gaps that define a magnetic field pattern corresponding to a servo band on a magnetic medium, wherein the set of gaps is arranged in an stepped configuration in which centerlines of tracks for the servo band are defined between each step in the stepped configuration of the gaps.

In another embodiment, the invention provides a servo writing device comprising an electromagnetic element to generate a magnetic field, and a layer formed over the electromagnetic element to define a set of gaps that define a magnetic field pattern corresponding to a servo band on a magnetic medium. The set of gaps is arranged to define a first subset of gaps positioned above and below a location corresponding to a first centerline of the servo band and corresponding to a first servo track, a second subset of gaps positioned above and below a location corresponding to a second centerline and corresponding to a second servo track of the servo band, and a third subset of gaps positioned above and below a location corresponding to a third centerline of the servo band and corresponding to a third servo track of the servo band, wherein the first subset of gaps, the second subset of gaps, and the third subset of gaps are unique relative to one another.

Various aspects of the invention can provide a number of advantages. In general, amplitude-based servo patterns can facilitate the ability to pinpoint locations on media surfaces with greater accuracy. Therefore, the described servo patterns can allow for smaller amounts of media surface to be used to store units of data. More particularly, the servo patterns described herein can eliminate the need for conventional track identification marks, e.g., which conventionally cross the centerlines. The servo patterns may also eliminate the need for conventional synchronization marks which also cross the centerlines. Eliminating the need for track identification marks and/or synchronization marks can simplify the process of recording the amplitude-base servo patterns on the medium, possibly improving media quality and/or reducing media manufacturing costs. Moreover, servo patterns making use of differently sized servo windows can simplify the pattern relative to conventional amplitude-based patterns by eliminating the need for additional marks conventionally used for synchronization in the servo detection process. Instead, widths of the differently sized servo windows can be measured in order to provide self-synchronization.

Additional details of these and other embodiments are set forth in the accompanying drawings and the description below. Other features, objects, and advantages of the invention will be apparent from the description and drawings, and from the claims.

DETAILED DESCRIPTION

Figure 1:
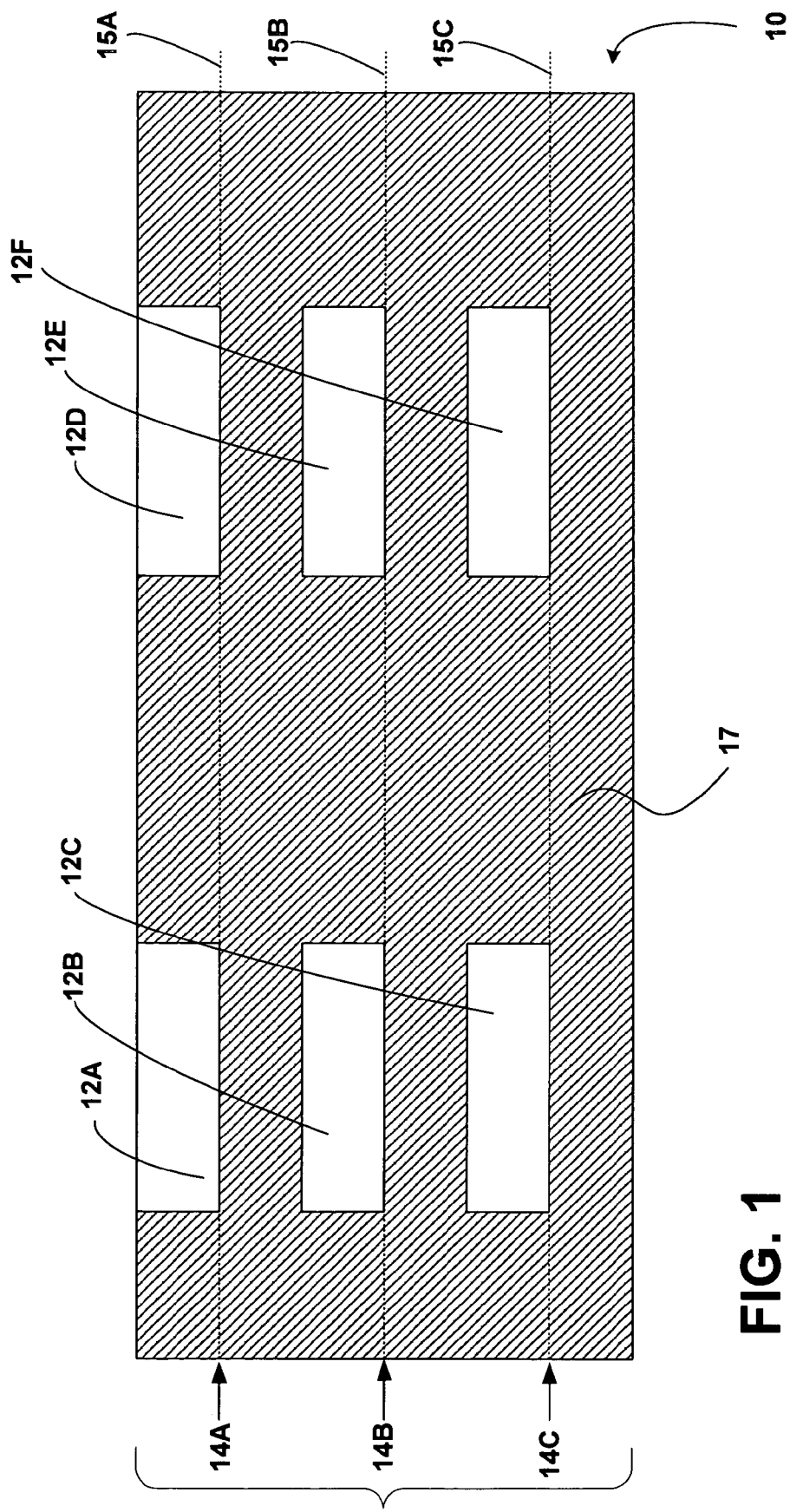
FIG. 1 is a depiction of a servo band portion of a prior art medium recorded with a conventional amplitude-based servo pattern.

FIG. 1 is a depiction of a servo band portion of a prior art medium 10 recorded with a conventional amplitude-based servo pattern. The conventional servo pattern illustrated in FIG. 1 includes a number of servo windows 12A–12F. Servo windows 12 may comprise areas where a previously recorded magnetic signal 17 has been erased from medium 10. Medium 10 includes three servo tracks 14A, 14B, 14C that define tracklines 15A, 15B, 15C. As a head moves over medium 10 relative to one of servo tracks 14, the strength of the magnetic signal detected by the head can identify the location of the head relative to a given one of tracklines 15.

For example, as a servo head moves partially over servo window 12A along trackline 15A, the detected signal amplitude should reduce by 50 percent if the head is precisely on-track. The detected signal is 100 percent when the head is not passing over a servo window, but reduces when the head passes partially over a servo window because the part of the head passing over the servo window is not exposed to a signal. If the detected signal amplitude falls by an amount greater or less than 50 percent as the head partially over servo window 12A along trackline 15A, then the head can be moved to better position the head over trackline 15A. In this manner, tracklines 15 of servo tracks 14 can be located. Corresponding data tracks (not shown) are located at defined displacements from tracklines 15 of servo tracks 14.

Figure 2:
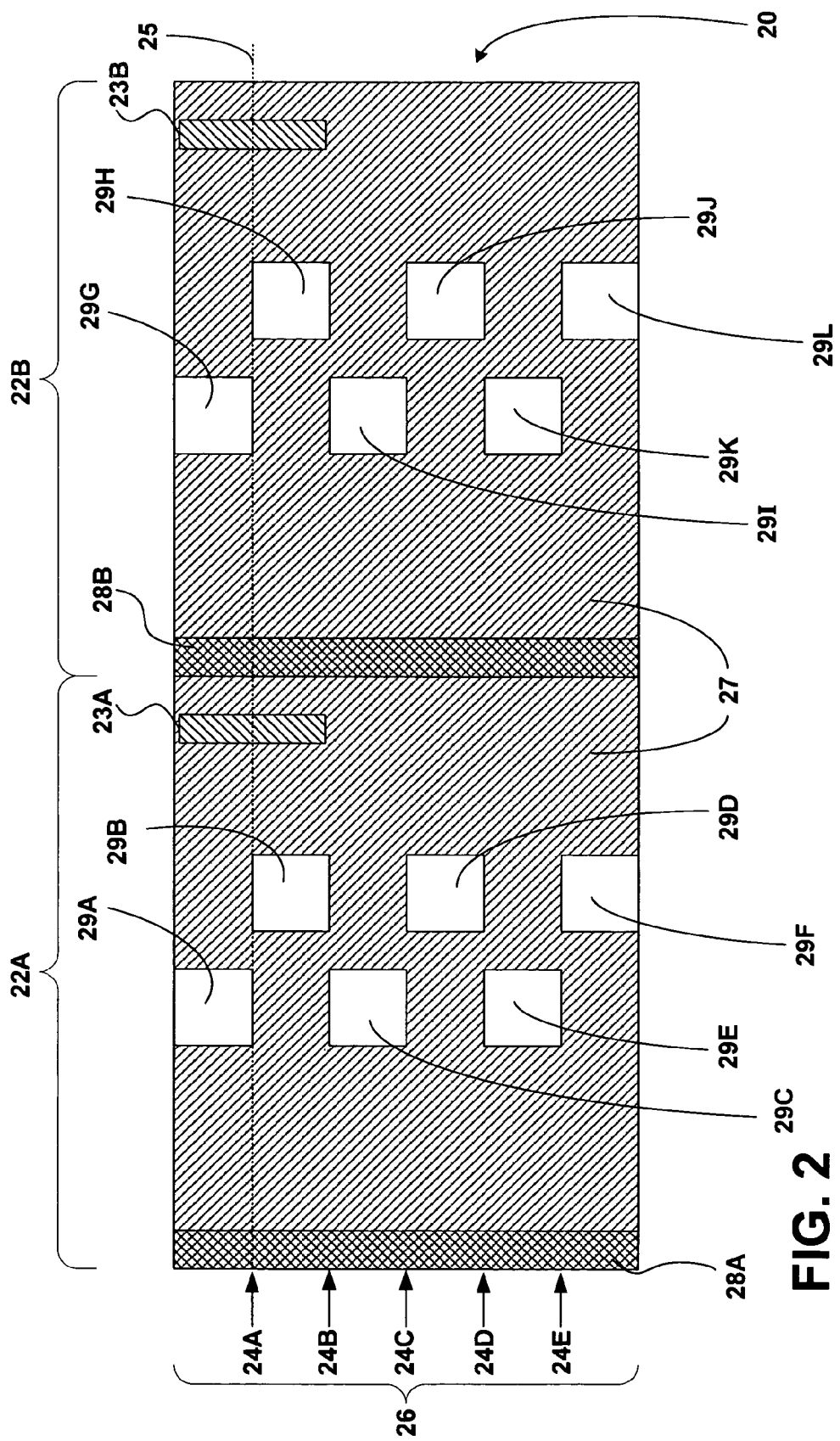
FIG. 2 is another depiction of a servo band portion of a prior art medium recorded with a conventional amplitude-based servo pattern.

FIG. 2 is another depiction of a servo band portion of a prior art medium 20 recorded with a conventional amplitude-based servo pattern. The conventional servo pattern in FIG. 2 includes two servo frames 22A and 22B. Each frame includes five servo tracks 24A, 24B, 24C, 24D and 24E. These five servo tracks 24 collectively define a servo band 26. In general, a servo band is defined as a collection of a plurality of servo tracks. Thus, a servo band could include any number of servo tracks. Each of servo tracks 24 may reside a known distance from a corresponding data track (not shown).

The servo pattern can be written by passing the medium under gaps of a servo write head. A relatively wide gap in the servo head can be used to record a magnetic signal 27 having a first frequency on the surface of medium 20. Moreover, a magnetic signal having a second frequency may define transition regions 28A and 28B between the individual frames. To record transition regions 28A and 28B, the frequency of the written signal is changed for a short period of time while the tape passes under the wide gap in the servo head. The transition regions 28 serve as synchronization marks in the prior art servo detection scheme.

A servo write head (or a separate erase head) having a relatively small write gap track width in the direction transverse to the servo track direction can be used to create erased servo windows 29. For example, erased servo windows 29A–29L (collectively erased servo windows 29) may form a checkerboard-like configuration that enables a read head to pinpoint track locations. In accordance with the prior art, the erased servo windows 29 respectively positioned above and below centerline 25 have a common width.

In operation, as medium 20 passes by a read head (not shown) positioned over a first track (indicated by numeral 24A), the position of erased servo windows 29A and 29B or 29G and 29H relative to magnetic signal 27, can accurately define the track location of the head. Similarly, the track locations of tracks 2–5 (indicated by numerals 24B–24E respectively) can be defined by the various erased servo windows 29 relative to magnetic pattern 27. Detection of transition regions 28 provides a synchronization mechanism so that when signal amplitude indicates head positioning that is off-track, the servo controller can determine whether to cause movement of the magnetic head laterally up or down in order to remedy the off-track head positioning. With common sized servo windows 29, the head controller could become out of sync if transition regions 28 or another type of synchronization mechanism is not recorded on medium 20 between servo frames 22. Transition regions 28 typically cross one or more centerlines 25.

Medium 20 also includes track identification marks 23A, 23B. Track identification marks 23 allow a servo controller to distinguish track 24A from tracks 24C and 24E. Without track identification marks 23 on medium 20, the detected signals associated with tracks 24A, 24C and 24E are generally indistinguishable. For this reason, medium 20 includes track identification marks 23 to distinguish track 24A from tracks 24C and 24E. For example, track identification marks 23 may comprise a magnetic signal having a different discernable frequency than signal 17. Track identification marks 23 are conventionally shaped differently than servo windows 29. Also, unlike servo windows 29, track identification marks 23 are not positioned or used for amplitude-based servo positioning. For example, track identification marks 23 typically cross one or more centerline 25. Adjacent servo bands may include track identification marks similar to marks 23, but positioned differently within the given band, so that tracks 24C, 24D and 24E can be identified. The discussion of FIG. 3 provides additional details of prior art use of conventional track identification marks.

Figure 3:
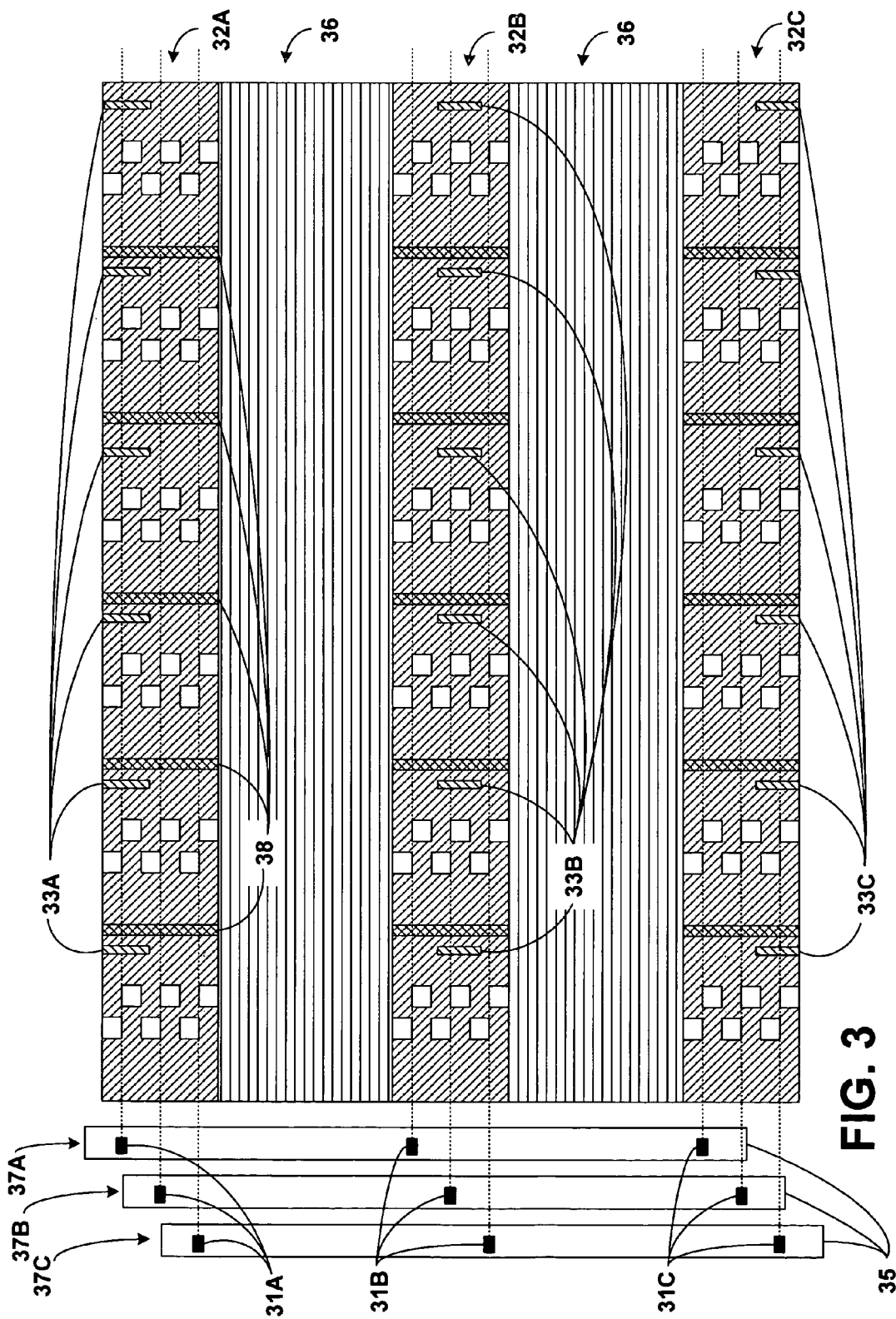
FIG. 3 is a depiction of a prior art medium recorded with conventional amplitude-based servo patterns.

FIG. 3 is a prior art depiction of medium 30 relative to a servo read device 35 including three magnetic heads 31A, 31B, 31C. In particular, servo read device 35 is illustrated in three exemplary location relative to medium 30. Medium 30 includes servo bands 32A, 32B and 32C. Data tracks 36 are positioned relative to servo bands 32. Each servo band 32 defines a plurality of servo tracks. Each servo band 32 includes synchronization marks 38 (only synchronization marks 38 of servo band 32A are labeled in FIG. 3 although every servo band 32 includes similar synchronization marks). Moreover, each servo band 32 includes track identification marks 33A–33C. Track identification marks 33A are located to cross the centerline of a first track of servo band 32A. However, track identification marks 33B are located to cross the centerline of a third track of servo band 32B, and track identification marks 33C are located to cross the centerline of a fifth of servo band 32C.

Servo device 35 including servo heads 31A, 31B and 31C is illustrated in three different locations relative to medium 30, i.e., locations 37A, 37B and 37C. In particular, servo heads 31A, 31B and 31C are illustrated along centerlines associated with a first track, a third track, and a fifth track of servo bands 32. When servo heads 31 are positioned along the centerline of the first track of servo bands 32 (as shown at 37A) or the second track, servo head 31A detects track identification marks 33A. When servo heads 31 are positioned along the centerline of the third track (as shown at 37B) or the fourth track, servo head 31B detects track identification marks 33B. When servo heads 31 are positioned along the centerline of the fifth track of servo bands 32 (as shown at 37C) or the fourth track, servo head 31C detects track identification marks 33C. In general, track identification marks 33 of different servo bands 32 are positioned to cross different centerlines. Accordingly, identification marks 33 can be detected by the different servo heads 31 of servo device 35 to distinguish the tracks of servo bands 32.

The creation of conventional synchronization marks and track identification marks such as track identification marks 33A, 33B and 33C, however, can be difficult. Conventional synchronization marks and track identification marks are typically created by recording magnetic signals at different frequencies than other signals recorded in servo bands 32. Modulating the frequency during magnetic recording is difficult, particularly when precise positioning of the servo synchronization marks or track identification marks is needed. In general, creating conventional synchronization marks and track identification marks adds complexity and cost to the fabrication of magnetic media.

The invention is directed to patterns of amplitude-based servo windows that eliminate the need for conventional track identification marks. In addition, the patterns of servo windows may eliminate the need for conventional synchronization marks. In accordance with the invention, the patterns of servo windows, themselves, can distinguish one track from another track in one or more servo bands. In other words, the same amplitude-based servo windows that define the centerlines of the tracks can be arranged to provide track identification information and possibly inherent synchronization information. In accordance with the invention, track identification marks that cross one or more of the centerlines can be completely eliminated. Also, synchronization marks that cross one or more of the centerlines can also be eliminated. Again, the elimination of conventional track identification marks and conventional synchronization marks can simplify media fabrication.

In some embodiments, different patterns of servo windows are defined in different bands of the medium such that a collective servo output signal associated with two similar tracks of two different servo bands is unique. In other words, a medium may include a first servo band including a first set of amplitude-based servo windows and a second servo band including a second set of amplitude-based servo windows, wherein the second set amplitude-based servo windows are arranged differently than the first set of amplitude-based servo windows. In other words, the first and second sets of amplitude-based servo windows define different servo patterns. In that case, the collective output associated with corresponding servo tracks of the two servo bands can be unique for each set of corresponding tracks of the servo bands.

In other embodiments, patterns of servo windows are defined such that every track of a given servo band defines a unique signal relative to the other tracks of that band. In other words, each track of a given servo band may define a unique output signal that can be interpreted to facilitate on-track positioning of a head and also identification of the track. In these ways, the need for conventional track identification marks and possibly synchronization marks can be eliminated. Accordingly, the invention can simplify media fabrication by eliminating the need to create such conventional track identification marks and/or synchronization marks.

Also described are various techniques and servo head configurations useful for creating the servo patterns described herein. In particular, servo writing devices formed with patterns of servo gaps are described that can facilitate relatively simple creation of complex patterns of servo windows, which inherently include synchronization and track identification information. Servo writing devices for simultaneously creating different patterns of servo windows in different servo bands are described. Also, servo writing devices for creating specific patterns in an individual servo band are described.

In general, the servo controller always knows what track it is seeking. The controller also knows how the position error signal will behave on the track that it is seeking, e.g., whether upward motion of the head causes greater or lesser signal during the time the head is near a given servo window. In other words, the polarity of the position error signal can be defined and known by the controller for any given track number. If an open loop servo system positions the head in the vicinity of the proper track, i.e., within one track pitch, when the loop is closed, the servo controller will cause the head to fall toward the desired and proper window edge.

Put another way, when the servo controller knows the expected behavior of a given track, the opposing edge of servo windows (corresponding to adjacent tracks) is not a stable closed loop position. Having two servo windows per track (one window on either side of track centerline) complicates track interpretation by the controller. If the windows are the same size and uniformly spaced (as a checkerboard), all the tracks look the same to the controller. Another element must therefore be added to provide the required differentiation and synchronization. This is provided in the prior art as a frequency shift in the un-windowed portion of the servo band. One aspect of this invention, however, provides this needed synchronization by altering the widths of servo windows for one or more of the tracks.

Figure 4:
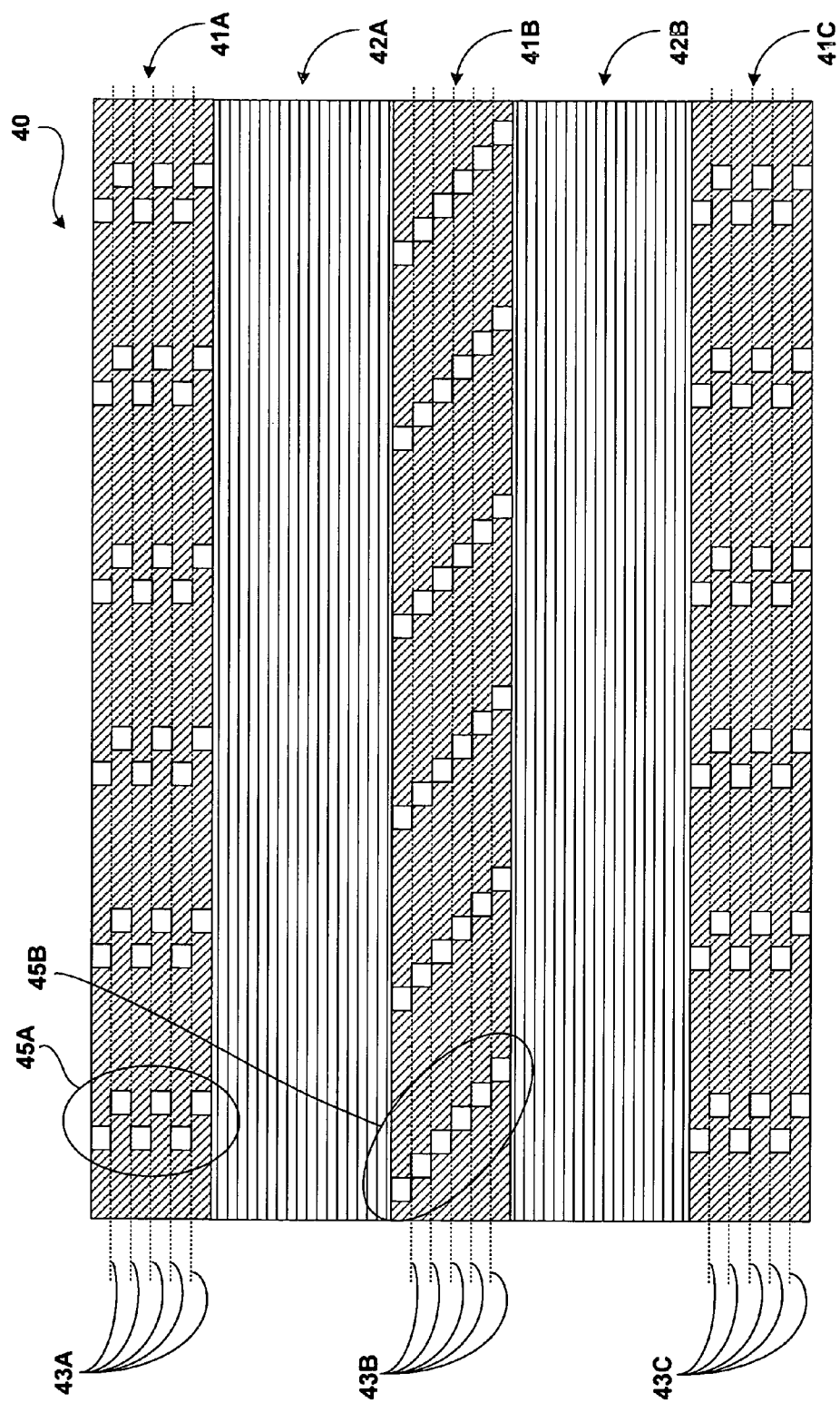
FIG. 4 is a depiction of a medium recorded with amplitude-based servo patterns according to an embodiment of the invention.

FIG. 4 is a depiction of medium 40 according to an embodiment of the invention. Medium 40 includes servo bands 41A–41C and data bands 42A, 42B. Data bands 42A, 42B are respectively positioned between the different servo bands 41. Each of servo bands 41 define a plurality of servo tracks. In particular, centerlines 43A, 43B and 43C correspond to the servo tracks of respective servo bands 41. Sets of amplitude-based servo windows 45 are arranged with respect to centerlines 43, e.g., with individual windows typically being adjacent one or more centerlines 43. The amplitude-based servo windows in sets 45 are generally not positioned to cross any of centerlines 43. As illustrated, the sets of servo windows 45 repeat to define successive servo frames along the length of medium 40.

Medium 40 includes a first servo band 41A including a first set of amplitude-based servo windows 45A. The first set of amplitude-based servo windows 45A defines a first set of servo tracks in first servo band 41A. In addition, medium 40 includes a second servo band 41B including a second set of amplitude-based servo windows 45B. The second set of amplitude-based servo windows 45B define a second set of servo tracks in second servo band 41B. Amplitude-based servo windows 45 may comprise areas where a recorded magnetic signal has been erased from medium 40, or alternatively the servo windows 45 may be magnetically recorded, rather than erased. In accordance with the invention, the second set of amplitude-based servo windows 45B are arranged differently than the first set of amplitude-based servo windows 45A. Again, amplitude-based servo windows 45 are generally not positioned to cross any of centerlines 43, unlike conventional identification marks or synchronization marks.

In the example of FIG. 4, first set of amplitude-based servo windows 45A is arranged in a checkerboard-like configuration, whereas second set of amplitude-based servo windows 45B is arranged in a stepped configuration. First set of amplitude-based servo windows 45A may be arranged similarly to conventional amplitude-based servo patterns. However, second set of amplitude-based servo windows 45B is arranged differently, e.g., in a stepped configuration in a direction perpendicular to the servo tracks. The stepped configuration of second set of amplitude-based servo windows 45B may define downward steps (as illustrated), or upward steps. The upward or downward steps generally refer to steps in a direction transverse to the length of the medium.

In any case, with first and second sets of amplitude-based servo windows 45A, 45B arranged differently, the collective output signals associated with two different heads moving over first and second servo bands 41A, 41B may be unique for any given set of tracks. Accordingly, the need for conventional identification marks can be eliminated. Instead, patterns of servo windows 45A, 45B can inherently include track identification information that can be detected by servo read heads and identified by a corresponding servo controller. In particular, the different arrangements, e.g., checkerboard versus stepped, serve to uniquely identify a first track associated with the different arrangements from a second track associated with the different arrangements.

Figure 5A:
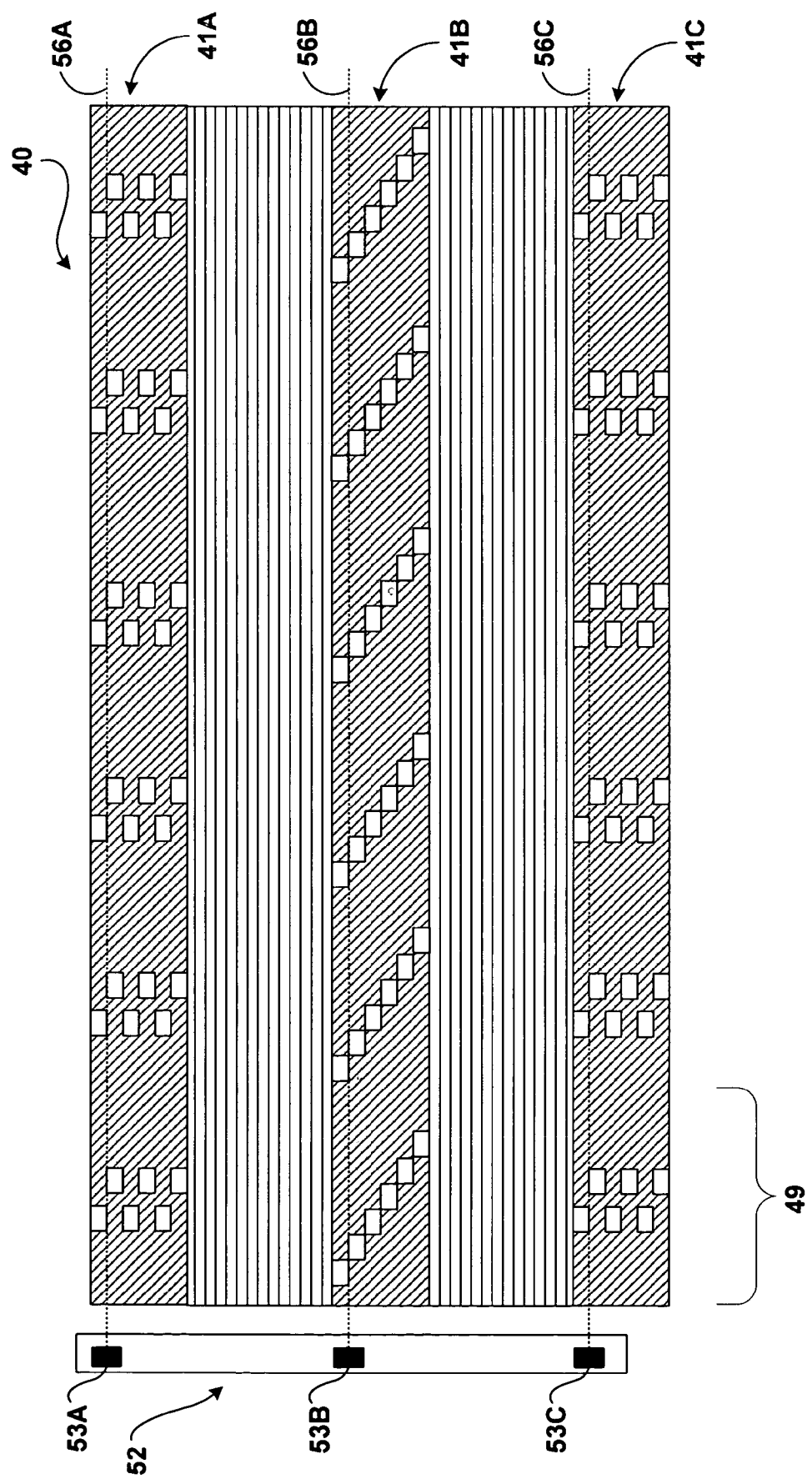
FIGS. 5A–5C is a depiction of the medium of FIG. 4 with servo read heads passing over the medium at various locations.
Figure 5B:
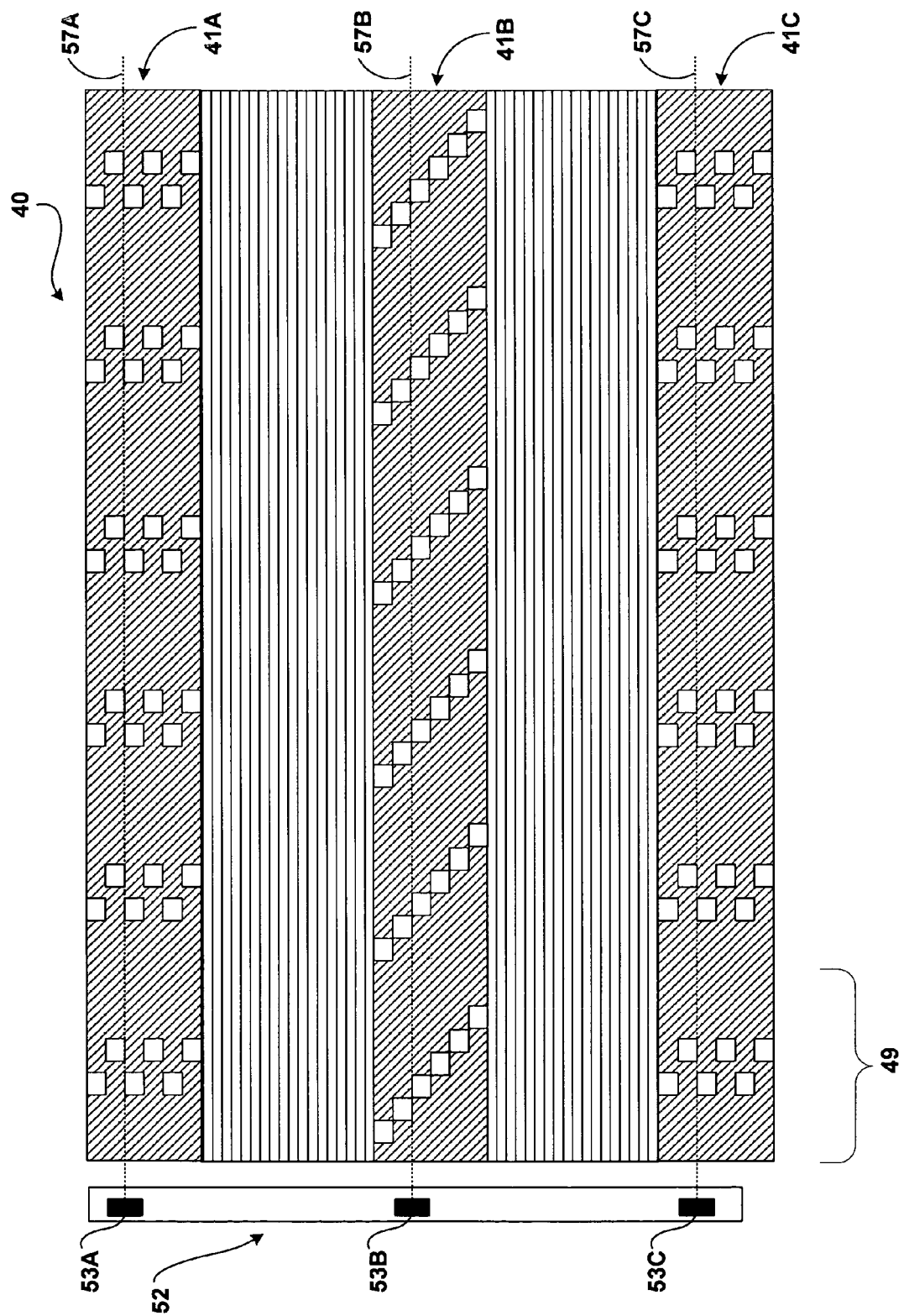
Figure 5C:
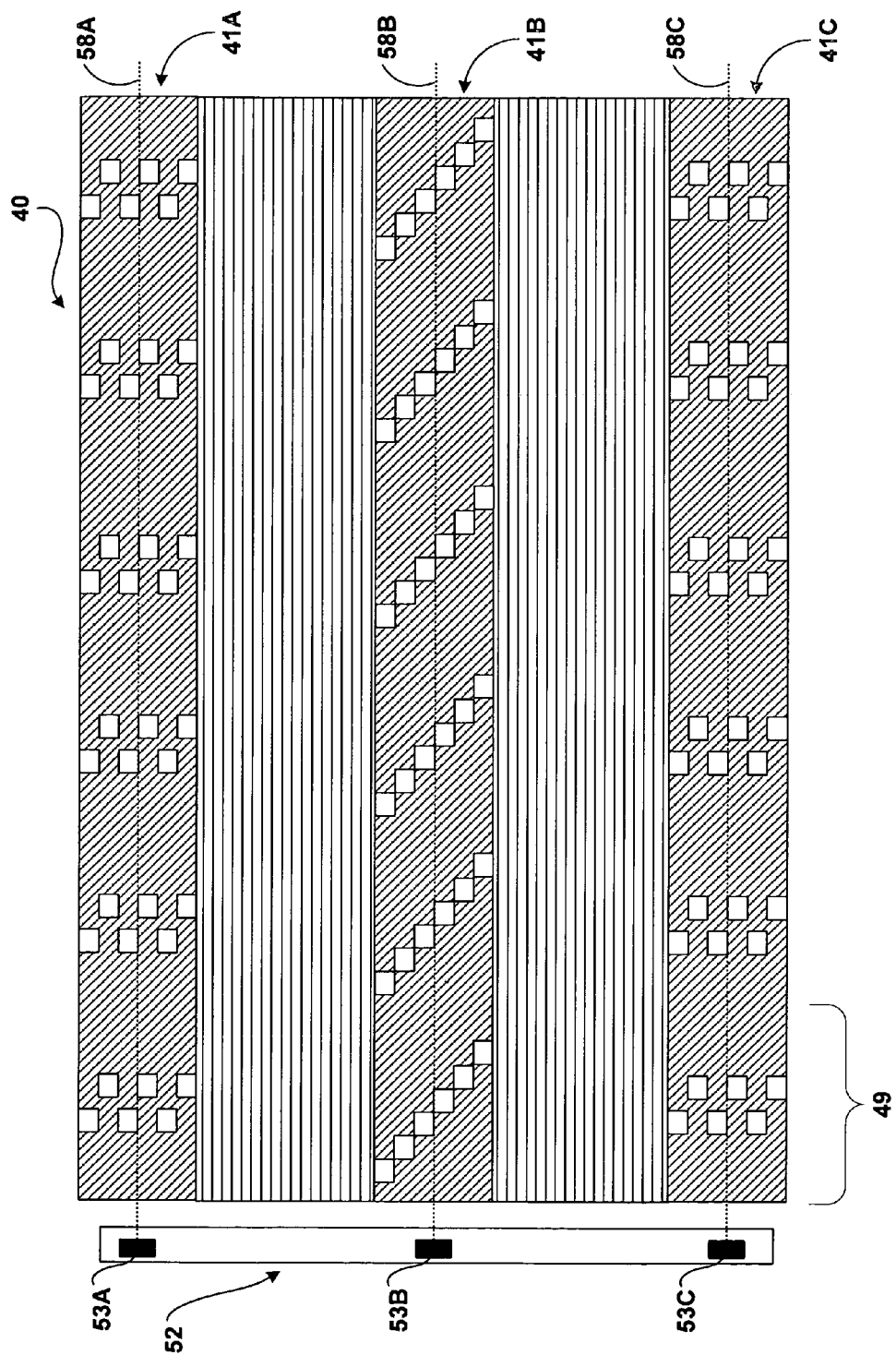

FIGS. 5A–5C are depictions of a servo device 52 passing relative to medium 40. In the example of FIGS. 5A–5C, servo device 52 includes three servo heads 53A, 53B, 53C positioned in servo device 52 to simultaneously track respective servo tracks of servo bands 41A, 41B and 41C. For example, servo heads 53A, 53B, 53C may comprise magnetic transducer heads that detect magnetic signals on the surface of medium 40. FIG. 5A illustrates servo heads 53A, 53B, 53C passing along centerlines 56A, 56B and 56C, which correspond to first servo tracks of servo bands 41. FIG. 5B illustrates servo heads 53A, 53B, 53C passing along centerlines 57A, 57B and 57C, which correspond to second servo tracks of servo bands 41. FIG. 5C illustrates servo heads 53A, 53B, 53C passing along centerlines 58A, 58B and 58C, which correspond to third servo tracks of servo bands 41.

Figure 6:
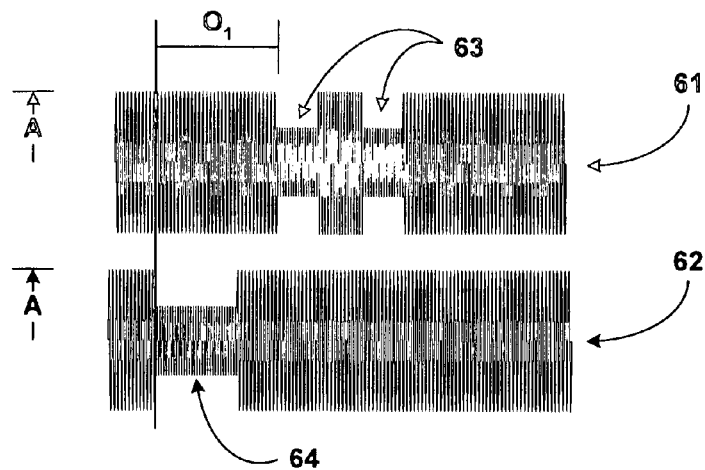
FIGS. 6–8 illustrate exemplary readout signals associated with servo read heads passing over a medium as shown in FIGS. 5A–5C respectively.

FIG. 6 illustrates exemplary output signals corresponding to FIG. 5A. In particular, FIG. 6 illustrates output signals 61, 62 associated with first servo head 53A and second servo head 53B, as heads 53A and 53B pass over region 49 of medium 40 along centerlines 56A and 56B. In general, variations in the amplitudes (A) of signals 61, 62 can be used to identify whether heads 53 are on-track. Signals 61 and 62 generally indicate on-track positioning because the amplitudes of signals 61 and 62 fall by 50 percent as heads 53A and 53B pass partially over servo windows in servo bands 41. If signals 61 and 62 fall by greater or less than 50 percent (at locations 63, 64), then position error signals generated by a servo controller should remedy the off-track positioning. In particular, the position error signals cause movement of heads 53 to positions that ensure that output signals appear like signals 61 and 62, which indicate on-track positioning with respect to centerlines 56A and 56B.

Figure 7:
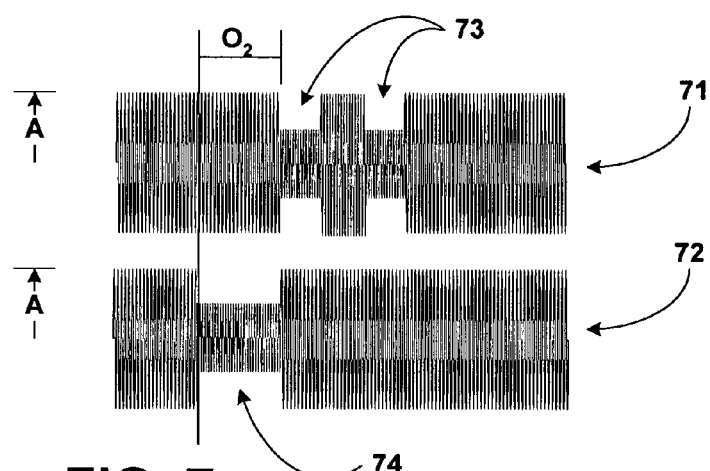

FIG. 7 illustrates exemplary output signals corresponding to FIG. 5B. In particular, FIG. 7 illustrates output signals 71, 72 associated with first servo head 53A and second servo head 53B, as heads 53A and 53B pass over region 49 of medium 40 along centerlines 57A and 57B. If signals 71 and 72 fall by greater or less than 50 percent (at locations 73, 74), then position error signals generated by a servo controller should remedy the off-track positioning. In that case, the position error signals cause movement of heads 53 to positions that ensure that output signals appear like signals 71 and 72, which indicate on-track positioning with respect to centerlines 57A and 57B.

Figure 8:
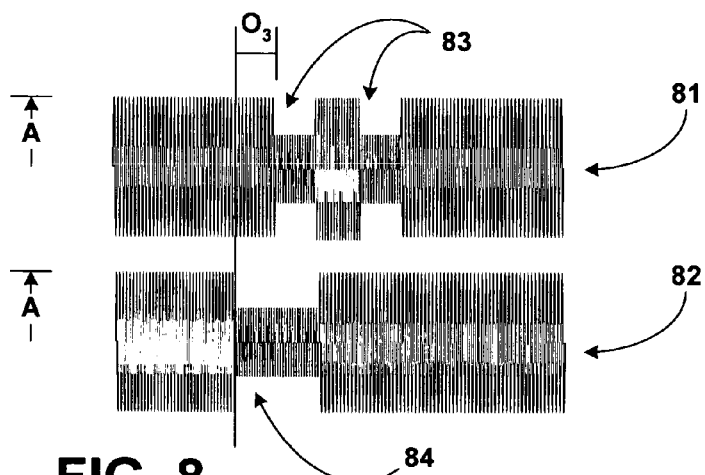

FIG. 8 illustrates output signals 81, 82 associated with first servo head 53A and second servo head 53B, as heads 53A and 53B pass over region 49 of medium 40 along centerlines 58A and 58B. If signals 81 and 82 fall by greater or less than 50 percent (at locations 83, 84), then position error signals generated by a servo controller should remedy the off-track positioning. Again, the position error signals cause movement of heads 53 to ensure that output signals appear like signals 81 and 82, which indicate on-track positioning with respect to centerlines 58A and 58B.

First and second sets of amplitude-based servo windows 45A, 45B are arranged differently, such that output signals 61 and 62 are collectively unique relative to output signals 71, 72 and output signals 81, 82. Similarly, output signals 71, 72 are collectively unique, and output signals 81, 82 are collectively unique. For example, offsets $O_1$, $O_2$ and $O_3$ are different for the different pairs of output signals, i.e., output signals 61, 62, output signals 71, 72 and output signals 81, 82. A servo controller can identify offsets $O_1$, $O_2$ or $O_3$ in order to identify the given servo track currently being read by servo device 52. Accordingly, the need for conventional track identification marks can be eliminated.

Figure 9:
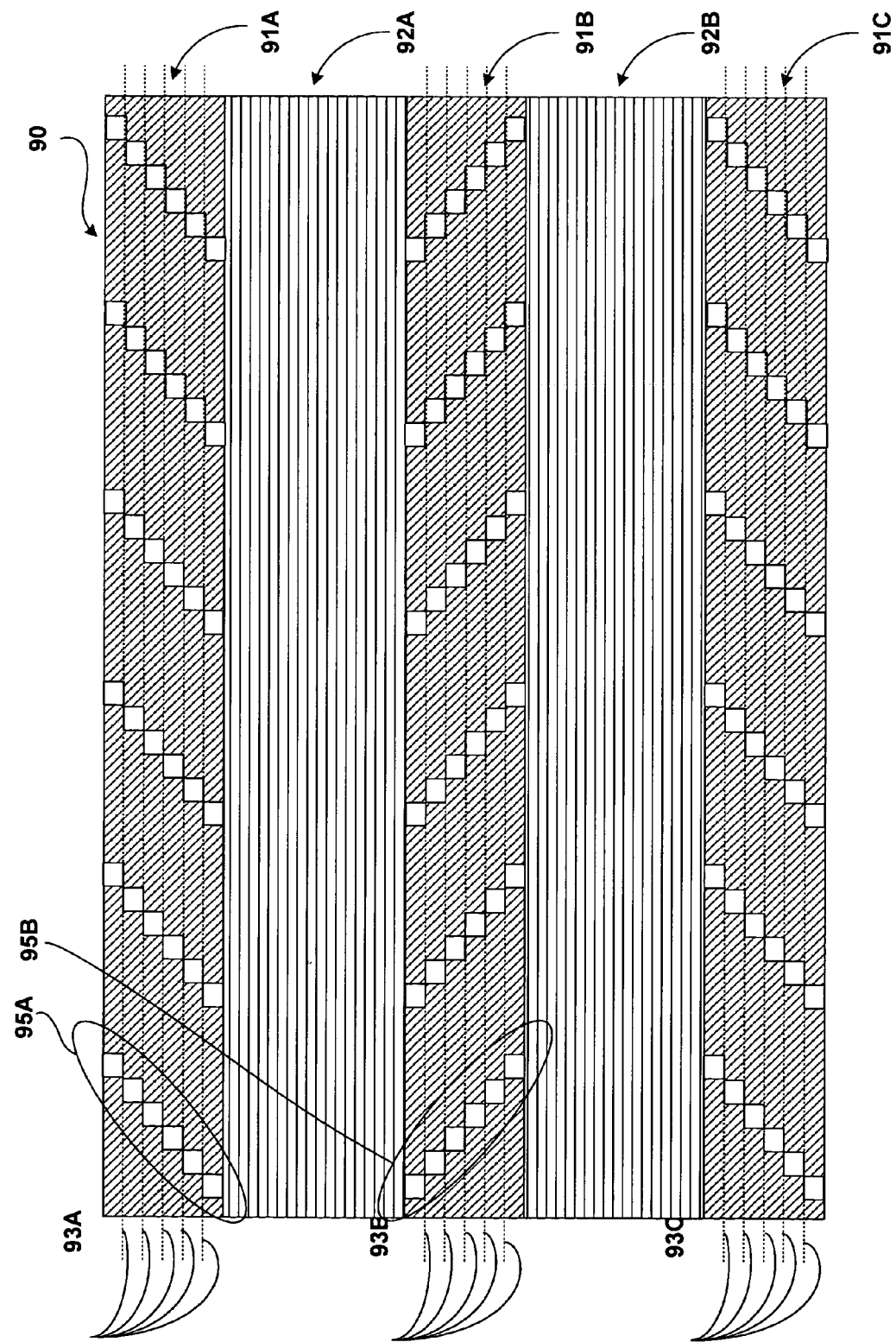
FIG. 9 is a depiction of a medium recorded with amplitude-based servo patterns according to an embodiment of the invention.

FIG. 9 is a depiction of medium 90 according to an embodiment of the invention. Medium 90 includes servo bands 91A–91C and data bands 92A, 92B between the servo bands. Each of servo bands 91 define a plurality of servo tracks. In particular, centerlines 93A, 93B and 93C correspond to the servo tracks of respective servo bands 91. The amplitude-based servo windows in sets 95 are arranged with respect to centerlines 93, e.g., with individual windows typically being adjacent one or more centerlines 93. The amplitude-based servo windows in sets 95 are generally not positioned to cross any of centerlines 93. As illustrated, the sets of servo windows 95 repeat to define successive servo frames along the length of medium 90.

Medium 90 includes a first servo band 91A including a first set amplitude-based servo windows 95A. The first set of amplitude-based servo windows 95A defines a first set of servo tracks in first servo band 91A. In addition, medium 90 includes a second servo band 91B including a second set amplitude-based servo windows 95B. The second set of amplitude-based servo windows 95B defines a second set of servo tracks in second servo band 91B. Amplitude-based servo windows 95 may comprise areas where a recorded magnetic signal has been erased from medium 90. Alternatively, servo windows 95 may be magnetically recorded with a magnetic signal, rather than erased. In accordance with the invention, the second set of amplitude-based servo windows 95B are arranged differently than the first set of amplitude-based servo windows 95A.

In this example, first set of amplitude-based servo windows 95A is arranged in a upward stepped configuration relative to a traverse direction of medium 90, whereas second set of amplitude-based servo windows 95B are arranged in a downward stepped configuration. In any case, with first and second sets of amplitude-based servo windows 95A, 95B arranged differently, the collective output signals associated with two different heads moving over first and second servo bands 91A, 91B can be unique for any given set of tracks. Accordingly, the need for conventional identification marks can be eliminated. Instead, patterns of servo windows 95A, 95B can inherently include track identification information that can be identified by servo read heads.

In other embodiments, any number of servo bands may be formed on a medium. The arrangement of amplitude-based servo windows in the different bands may alternate. In other words, every other servo band may have a similar arrangement of servo windows, but adjacent servo bands may define different arrangements, in order to facilitate track identification as described herein. In still other embodiments, each servo band may define a unique pattern of servo windows relative to all other servo bands. In any case, arrangement of amplitude-based servo windows as described herein can encode more information than conventional patterns of servo windows. For example, track identification information and possibly synchronization information may be encoded in the patterns of amplitude-based servo windows. Different patterns in different servo bands, in particular, is a useful way to encode track identification information in the arrangements of amplitude-based servo windows.

Figure 10:
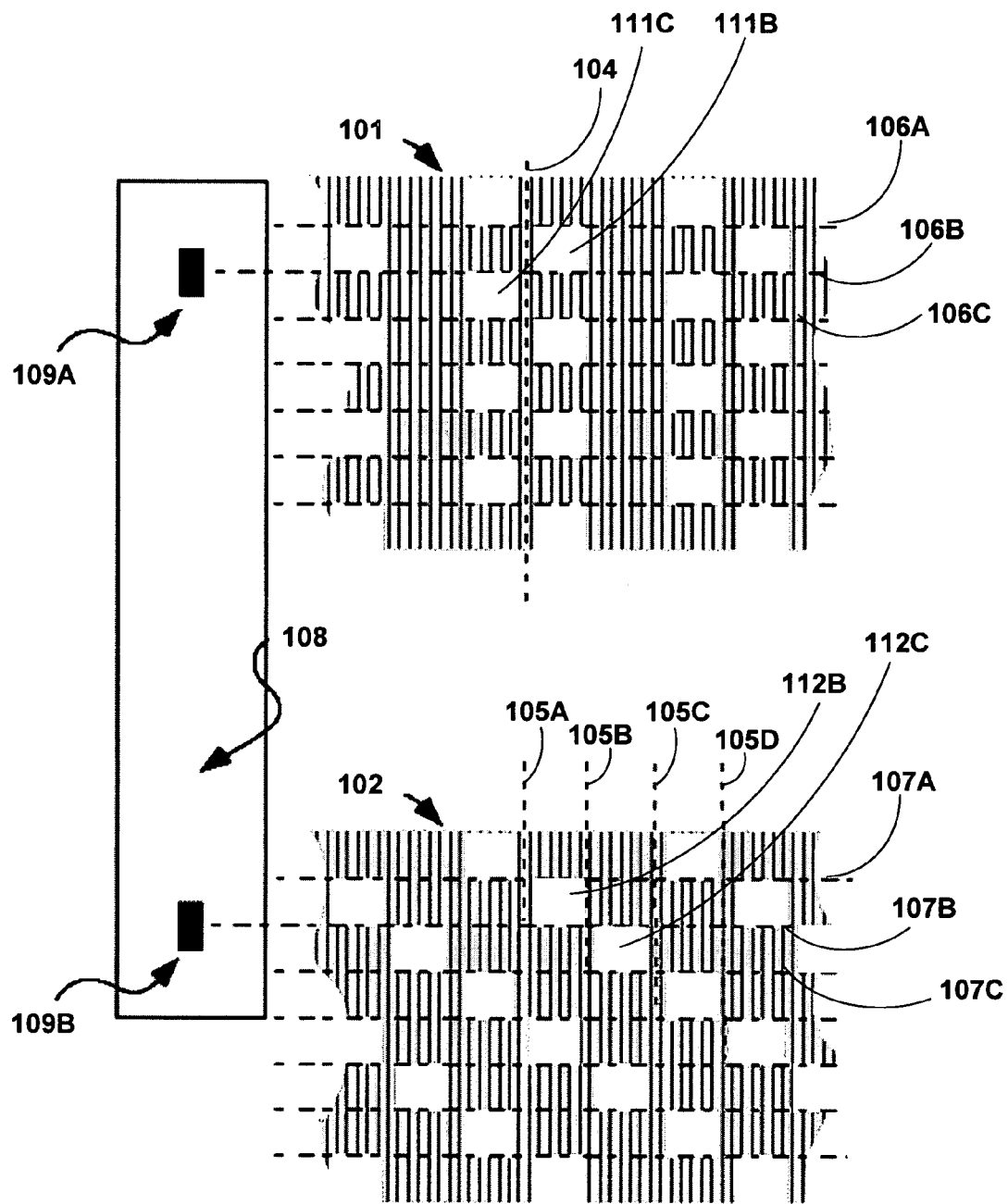
FIG. 10 is a depiction of a medium with servo read heads passing over the medium according to an embodiment of the invention.

FIG. 10 illustrates a pair of servo bands 101, 102, similar to servo bands 41A and 41B (FIG. 4). Servo band 101 may include an arrangement of amplitude-based servo windows that are arranged similarly to conventional checkerboard-like configurations. Servo band 102 differs from servo band 101 such that the longitudinal position of each successive pair of amplitude-based servo windows is offset from each other. In other words, longitudinal centerline 104 of servo band 101 is coincident, whereas longitudinal centerlines 105A–105D of successive amplitude-based servo windows in band 102 are not coincident with each other. Instead, longitudinal centerlines 105A–105D differ by a distance that can be discerned by a servo controller that decodes detected signals.

Servo device 108 contains at least two independent servo read heads 109A, 109B, one of which is positioned proximate to servo band 101, and the other to servo band 102. If servo read head 109A is positioned over centerline 106A associated with a first track of servo band 101, then servo read head 109B will be similarly positioned over centerline 107A associated with a first track of servo band 102. If servo head read 109A is positioned over centerline 106B associated with a second track of servo band 101, then servo head read 109B will be similarly positioned over centerline 107B associated with a second track of servo band 102. This way, heads 109, can detect the relative distance between amplitude-based servo windows in bands 101 and 102, and a servo controller can interpret the distance into a transverse or cross-tape position of servo device 108. Accordingly, the need for additional track identification marks can be eliminated. In FIG. 10, however, the amount of stagger of the windows in band 102 would be insufficient to allow a controller to differentiate longitudinal centerline 105A longitudinal centerline 105D. For this reason, additional stagger would be preferred, e.g., without overlap between the staggered windows.

Figure 11:
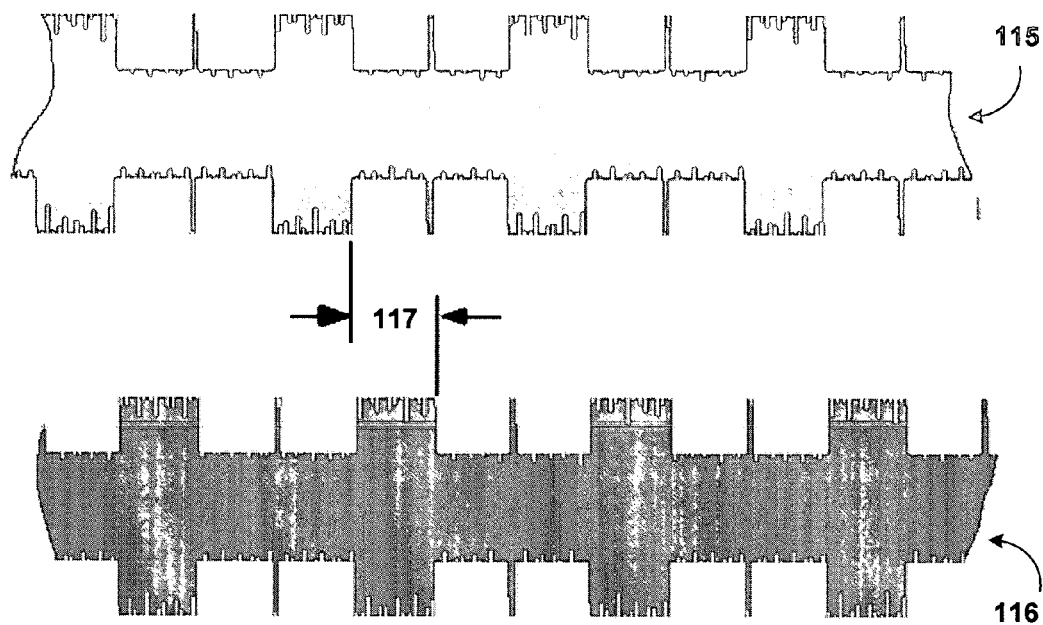
FIGS. 11 and 12 illustrate exemplary readout signals associated with servo read heads passing over a medium as shown in FIG. 10.
Figure 12:
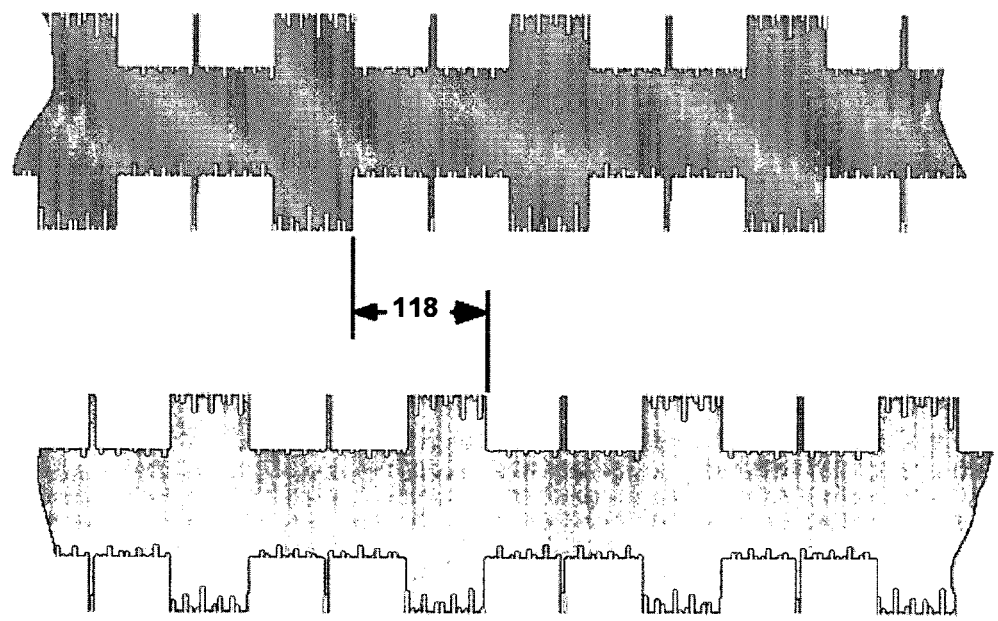

FIG. 11 shows output waveforms 115, 116 respectively detected by servo heads 109A and 109B when head 109A is tracking on centerline 106B, and head 109B is tracking on centerline 107B. The relative distance between servo window pairs 111B and 111C, and 112B and 112C can be discerned by detecting timing offset 117. Similarly, FIG. 12 shows output waveforms from servo heads 109A and 109B when head 109A is tracking on centerline 106C and head 109B is tracking on centerline 107C. Time offsets 117 and 118 are different, and therefore can be used to uniquely define the track positions of heads 101, 102.

Figure 13:
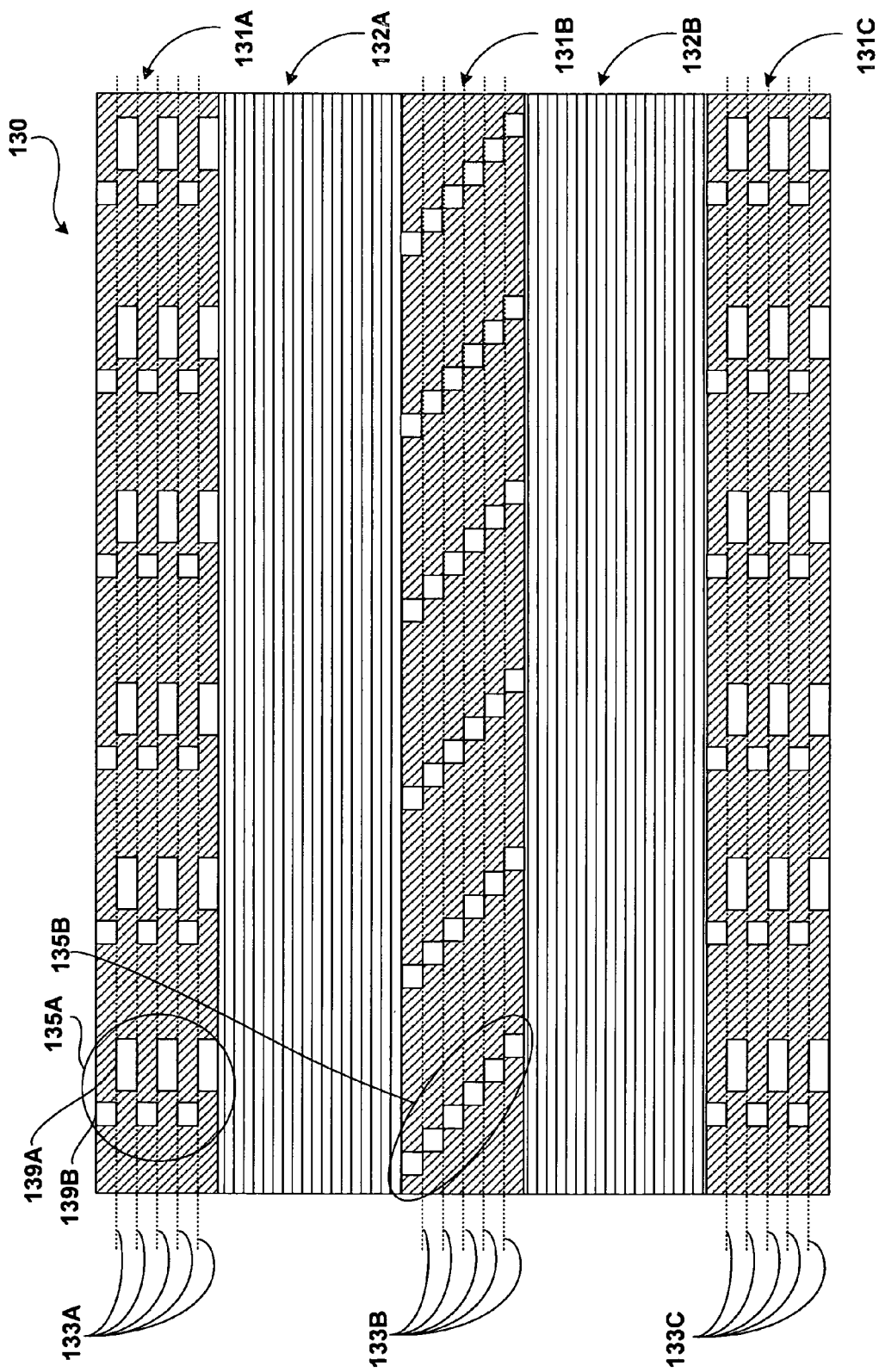
FIG. 13 is a depiction of a medium recorded with amplitude-based servo patterns according to an embodiment of the invention.

FIG. 13 is a depiction of medium 130 according to an embodiment of the invention. Medium 130 includes servo bands 131A–131C and data bands 132A, 132B between servo bands 131. Each of servo bands 131 defines a plurality of servo tracks. In particular, centerlines 133A, 133B and 133C correspond to the servo tracks of respective servo bands 131. The amplitude-based servo windows in sets 135 are arranged with respect to centerlines 133, e.g., with individual windows typically being adjacent one or more centerlines 133. The amplitude-based servo windows in sets 135 are generally not positioned to cross any of centerlines 133. As illustrated, the sets of servo windows 135 repeat to define successive servo frames along the length of medium 130.

In particular, medium 130 includes a first servo band 131A including a first set amplitude-based servo windows 135A. The first set of amplitude-based servo windows 135A defines a first set of servo tracks in first servo band 131A. In addition, medium 130 includes a second servo band 131B including a second set amplitude-based servo windows 135B, wherein the second set of amplitude-based servo windows 135B defines a second set of servo tracks in second servo band 131B. In accordance with the invention, the second set of amplitude-based servo windows 135B is arranged differently than the first set of amplitude-based servo windows 135A.

In this example, first set of amplitude-based servo windows 135A is further defined to facilitate synchronization. In particular, two or more of the different windows of the first set of amplitude-based servo windows 135A defines widths that are different relative to one another. For example, with respect to centerline 133, the amplitude-based servo window 139A adjacent and above centerline 133 defines a width that is different than the amplitude-based servo window 139B adjacent and below centerline 133. A servo controller can decode and distinguish signals associated with amplitude-based servo window 139A from signals associated with amplitude-based servo window 139B. Such features allow the servo decoding system to synchronize to the servo pattern without the need for conventional synchronization marks, such as marks 37 (FIG. 3).

Additional details of servo patterns similar to those illustrated in servo band 131A, that allow for self-synchronization without the need for conventional synchronization marks, are outlined in co-pending and commonly assigned U.S. patent application Ser. No. 10/464,394, filed Jun. 17, 2003 for Molsted and Yip, entitled AMPLITUDE-BASED SERVO PATTERNS FOR MAGNETIC MEDIA, and said application being hereby incorporated by reference herein in its entirety.

Figure 14:
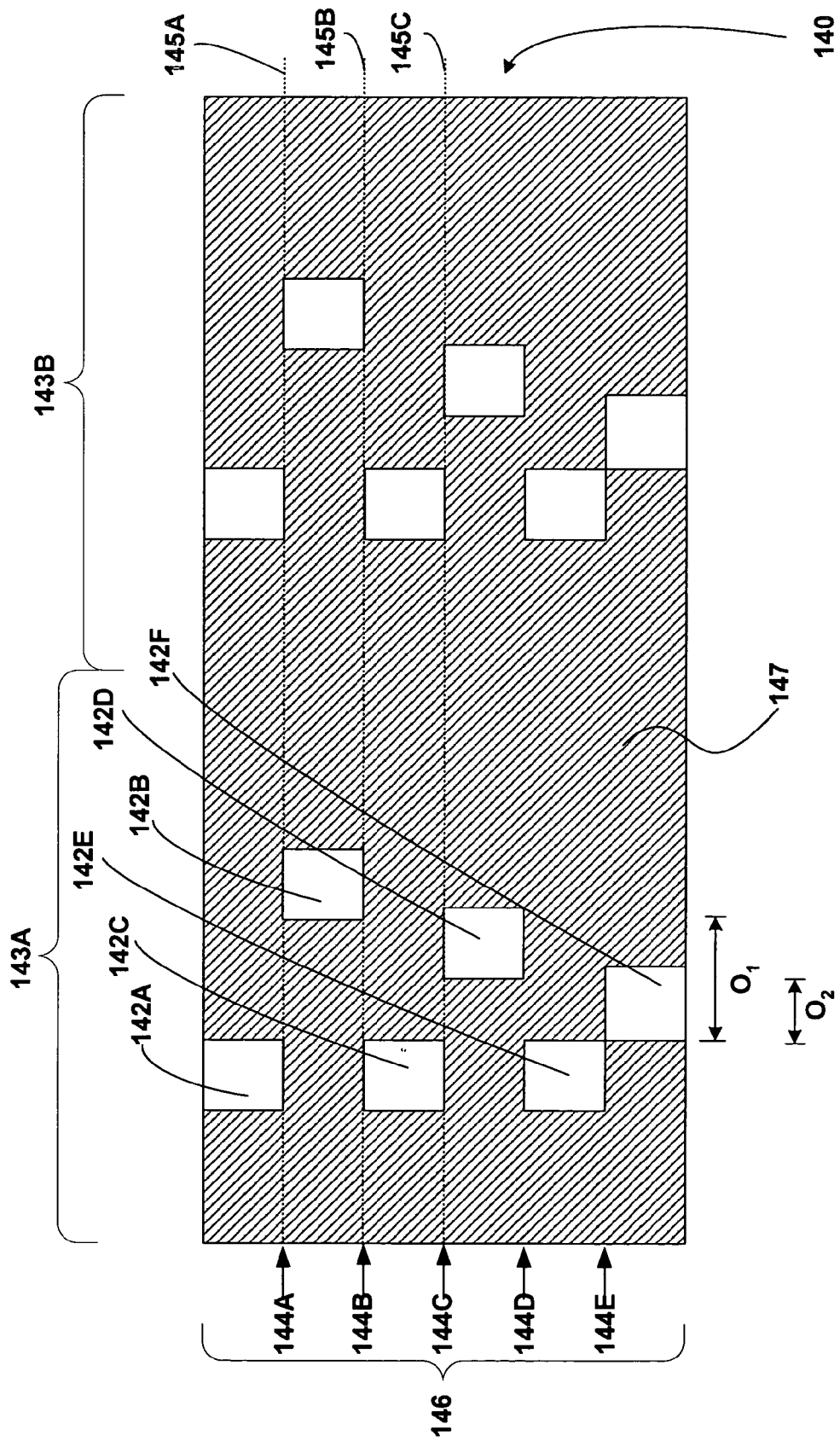
FIG. 14 is a depiction of a medium recorded with an amplitude-based servo pattern according to another embodiment of the invention.

FIG. 14 is a depiction of a servo band portion of a medium 140 recorded with a amplitude-based servo pattern according to another embodiment of the invention. The servo pattern illustrated in FIG. 14 includes a servo band 146 defining a plurality of servo tracks 144A–144E. A set of servo windows 142A–142F define servo tracks 144A–144E. As illustrated, the set of servo windows 142 repeats for successive servo frames 143A–143B. Servo windows 142 may comprise areas where a magnetic signal 147 has been erased from medium 140. Alternatively, servo windows 142 may be magnetically written, rather than erased.

Servo band 146 includes a first servo track 144A defined by a first subset of the amplitude-based servo windows 142A, 142B positioned above and below a first centerline 145A, e.g., with each of servo windows 142A, 142B typically being adjacent centerline 145A. Servo band 146 also includes a second servo track 144B adjacent first servo track 144A and defined by a second subset of the amplitude-based servo windows 142B, 142C positioned above and below a second centerline 145B. In addition, servo band 146 includes a third servo track 144C adjacent second servo track 144B and defined by a third subset of the amplitude-based servo windows 142C, 142D positioned above and below a third centerline 145C. In accordance with the invention, amplitude-based servo windows 142 are arranged such that output signals associated with the first servo track 144A and third servo track 144C are unique relative to one another.

In particular, in medium 140, a distance between the amplitude-based servo windows in the first subset 142A, 142B that are above and below first centerline 145A is different than a distance between the amplitude-based servo windows in the third subset 142C, 142D that are above and below the third centerline 144C. In other words, offset ($O_1$) between the trailing edge of servo window 142A and the leading edge of servo window 142B is different than offset ($O_2$) between the trailing edge of servo window 142C and the leading edge of servo window 142D. The offsets ($O_1$) or ($O_2$) can be discerned by a servo controller and interpreted to identify track location relative to medium 140. Track identification between the first track 144A and the second track 144B may be discerned by identification of the fact that servo window 142B is below centerline 145A for first track 144A and above centerline 145B for second track 144B.

In embodiments like FIG. 14, where a single servo band includes inherent track identification information, the servo controller would distinguish between tracks which share a common servo window. In particular, for a pattern like that of FIG. 14, the controller would differentiate between tracks 144A and 144B, and would also differentiate between tracks 144C and 144D. This can be accomplished by the controller testing the sign of the position error signal as the system acquires a track. In this case, the track identification feature is inherent in the servo window pairs. As the controller locks onto the track, if movement of the servo head upward increases the amplitude from servo sample, then the head must be on track 144B because increased output from the first servo sample is associated with head movement off of servo window 142C. Similarly, if the amplitude decreases, than the head must be on 144A.

Figure 15:
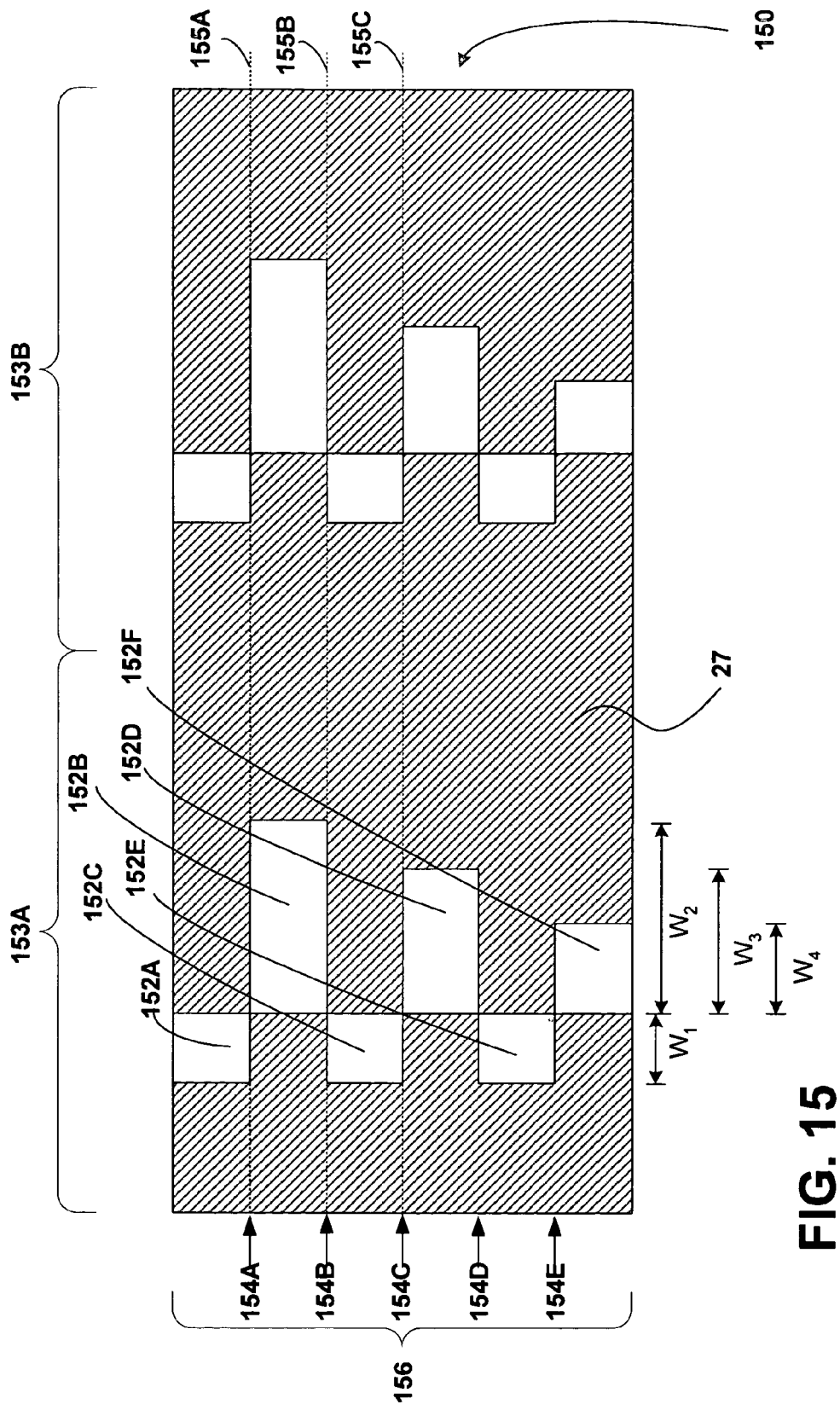
FIG. 15 is a depiction of a medium recorded with an amplitude-based servo pattern according to an embodiment of the invention.

FIG. 15 is a depiction of a servo band portion of a medium 150 recorded with a amplitude-based servo pattern according to another embodiment of the invention. The servo pattern illustrated in FIG. 15 includes a servo band 156 defining a plurality of servo tracks 154A–154E. A set of servo windows servo windows 152A–152F defines servo tracks 154A–154E. As illustrated, the set of servo windows 152 repeat for successive servo frames 153A–153B. Servo windows 152 may comprise areas where a magnetic signal 157 has been erased from medium 150. Alternatively, servo windows 152 may be magnetically recorded with a magnetic signal, rather than erased.

Servo band 156 includes a first servo track 154A defined by a first subset of the amplitude-based servo windows 152A, 152B positioned above and below a first centerline 155A, e.g., with each of servo windows 152A, 152B typically being adjacent centerline 155A. Servo band 156 also includes a second servo track 154B adjacent first servo track 154A and defined by a second subset of the amplitude-based servo windows 152B, 152C positioned above and below a second centerline 155B. In addition, servo band 156 includes a third servo track 154C adjacent second servo track 154B and defined by a third subset of the amplitude-based servo windows 152C, 152D positioned above and below a third centerline 155C. In accordance with the invention, amplitude-based servo windows 152 are arranged such that output signals associated with the first servo track 154A and third servo track 154C are unique relative to one another.

In particular, in medium 150, a width of at least one of the amplitude-based servo windows in the first subset 152A, 152B is different than a width of at least one of the amplitude-based servo windows in the third subset 152C, 152D. In this example, windows 152A and 152C have similar widths, but the widths of windows 152B and 152D vary. More specifically, servo windows 152A, 152C and 152E define a width ($W_1$), servo window 152B defines a width ($W_2$), servo window 152D defines a width ($W_3$), and servo window 152F defines a width ($W_4$). Because the widths of servo windows 152B, 152D, 152F are different relative to one another, a servo controller can distinguish signals associated with the different tracks 154A–154E. Accordingly, the need for track identification marks, e.g. that conventionally cross the centerlines, can be eliminated.

Moreover, in medium 150, each pair of servo windows that defines a given track 154 vary relative to one another. In other words, widths of servo windows 152A and 152B, which define track 154A are different relative to one another, widths of servo windows 152B and 152C, which define track 154B are different relative to one another, widths of servo windows 152C and 152D, which define track 154C, are different relative to one another, widths of servo windows 152D and 152E, which define track 154D, are different relative to one another, and widths of servo windows 152E and 152F, which define track 154E are different relative to one another. As described above with reference to FIG. 13, varying the widths of servo windows that are positioned above and below a given centerline of a given track can provide inherent synchronization information within the servo windows. Accordingly, the need for additional synchronization marks that cross the centerlines can be eliminated.

In the embodiment illustrated in FIG. 15, second servo window 152B and fourth servo window 152D have varying widths. Alternatively, first servo window 152A and third servo window 152C could be defined to have the have varying widths to achieve track identification and inherent synchronization information in the pattern of servo windows.

Figure 16:
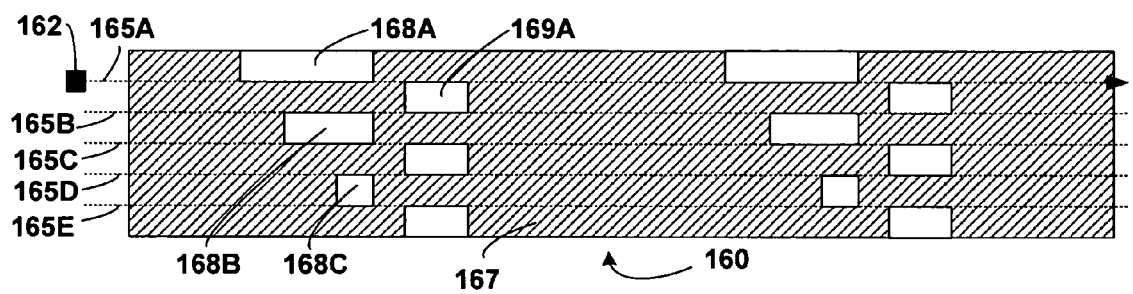
FIGS. 16, 18 and 20 illustrate a magnetic head relative to a medium recorded with a servo pattern according to an embodiment of the invention.
Figure 17:
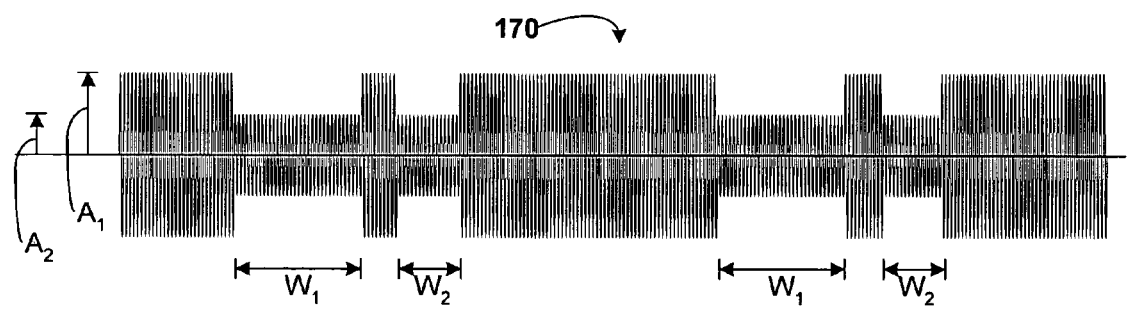
FIGS. 17, 19 and 21 illustrate the corresponding readout signals respectively associated with the magnetic head passing relative to the medium as illustrated in FIGS. 16, 18 and 20.

FIG. 16 is a depiction of the servo band portion of medium 160. In addition, FIG. 16 illustrates a magnetic head 162 relative to medium 160 along centerline 165A of a first servo tracks of medium 160. In other words, head 162 passes over medium 160, or alternatively medium 160 passes under head 162. FIG. 17 illustrates the corresponding readout signal 170 of magnetic head 160 as it passes relative to medium 160 along centerline 165A as depicted in FIG. 16.

When head 162 passes relative to region 167 that is completely recorded, readout signal 170 assumes its 100% maximum value $A_1$. However, when head 162 passes partially over one of servo windows 168A or 169A along centerline 165, signal 170 assumes value $A_2$, which is approximately 50% of the maximum value $A_1$. In other words, when head 162 is positioned precisely along centerline 165 at one of servo windows 168A or 169A, one-half of head 162 detects the signal in region 167 and the other half of head 162 passes over a non-recorded servo window 168A or 169A.

Readout signal 170 also provides a measure of widths $W_1$ and $W_2$, which correspond to the widths of servo windows 168 and 169, respectively. Because widths $W_1$ and $W_2$ are different from each other, a controller associated with head 162 can analyze readout signal 170 and determine whether an occurrence of amplitude $A_2$ corresponded to servo window 168A above centerline 165 or servo window 169A below centerline 165. Accordingly, the need for conventional synchronization marks in the servo pattern on medium 160 can be eliminated.

Moreover, the width of servo window 168B is different than the width of servo window 168A, and the width of servo window 168C is different than the widths of either of servo windows 168A or 168B. Thus, the readout signals associated with different tracks (identified by centerlines 165A–165E) can be distinguished by variance in width $W_1$. In particular, the readout signals for first track corresponding to centerline 165A would be different than the readout signals for either of third or fifth tracks, corresponding to centerlines 165C and 165E respectively, because of variance in width $W_1$. A servo controller associated with head 162 can analyze such variance in the readout signal in order to facilitate track identification without the need for conventional track identification marks that span across one or more centerlines 165.

Figure 18:
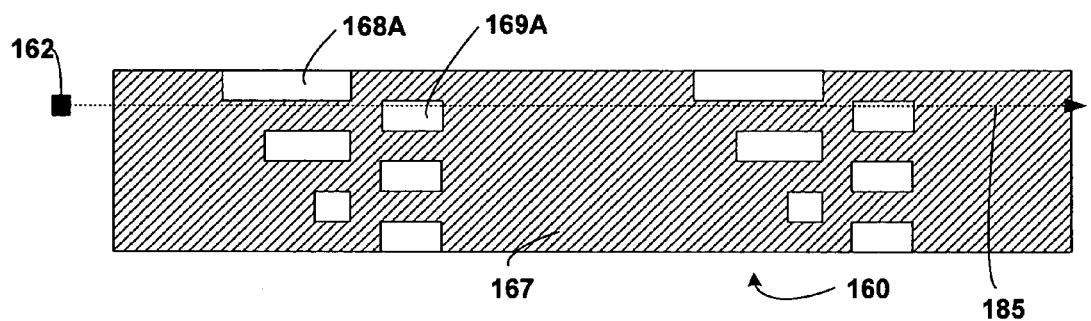
Figure 19:
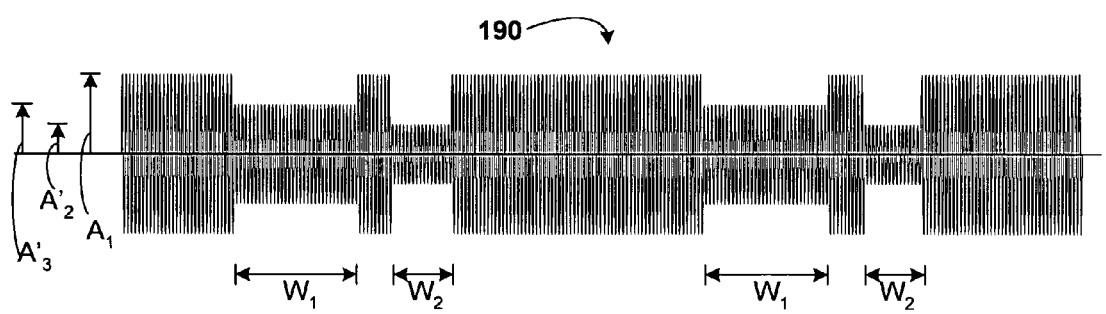

FIG. 18 is another depiction of the servo band portion of medium 160. In addition, FIG. 16 illustrates a magnetic head 162 passing relative to medium 160 along a line 185, which is slightly below the centerline 165A corresponding to the first servo track (FIG. 16) of medium 160. FIG. 19 illustrates the corresponding readout signal 190 of magnetic head 162 as it passes relative to medium 160 along line 185 as depicted in FIG. 18.

When head 162 passes relative to region 167 that is completely recorded, readout signal 190 assumes its 100% maximum value $A_1$. However, when head 162 passes partially over one of servo windows 168A or 169A along line 185, signal 190 assumes different values. In particular, when head 162 passes partially over servo window 168A along line 185, signal 190 assumes value $A'_3$, which is less than $A_1$, but larger than 50% of $A_1$. When head 162 passes partially over servo window 169A along line 185, signal 190 assumes value $A'_2$, which is less than 50% of $A_1$.

Readout signal 190 also provides a measure of widths $W_1$ and $W_2$, which correspond to the widths of servo windows 168A and 169A, respectively. Moreover, relative to centerline 165C or centerline 165E (labeled in FIG. 16), the readout signal would also reflect variance in width $W_1$, which can facilitate track identification as described herein.

Because widths $W_1$ and $W_2$ are different from each other, a controller associated with head 162 can analyze readout signal 190 and determine that $A'_2$ is associated with a window below the centerline and $A'_3$ is associated with a window above the centerline. Thus, the controller can determine that head 162 is off-track and needs to be moved laterally upward. Again, synchronization marks are not needed because differing widths of windows 168A and 169A allow for self-synchronization. Moreover, variance in width $W_1$ in the readout signal can allow the controller to determine which servo track is being read by head 162 at a particular time.

Figure 20:
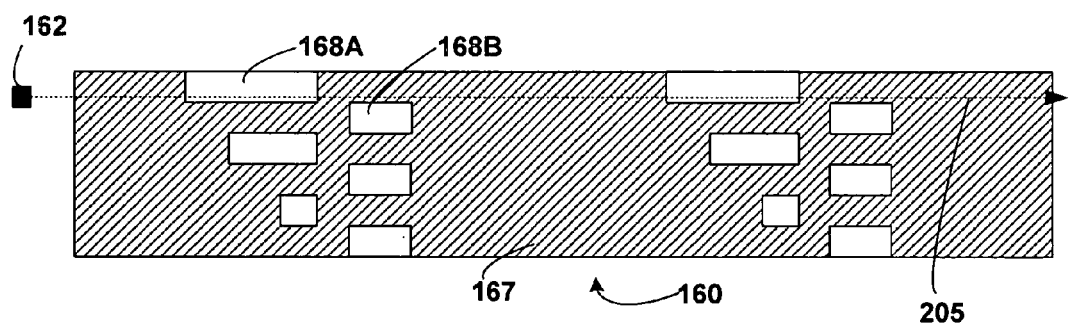
Figure 21:
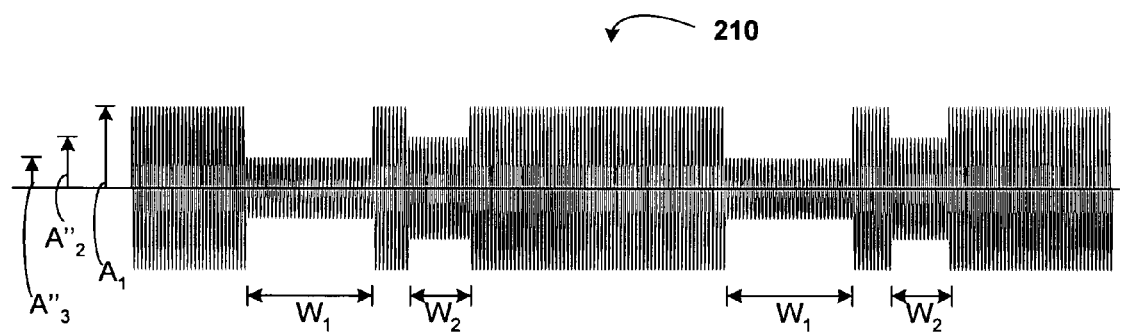

FIG. 20 is another depiction of the servo band portion of medium 160. In addition, FIG. 20 illustrates a magnetic head 162 passing relative to medium 160 along a line 205, which is slightly above centerline 165A of the first servo track (FIG. 16). FIG. 21 illustrates the corresponding readout signal 210 of magnetic head 162 as it passes relative to medium 160 along line 205 as depicted in FIG. 20.

When head 162 passes relative to region 167 that is completely recorded, readout signal 210 assumes its 100% maximum value $A_1$. However, when head 162 passes partially over one of servo windows 168A or 168B along line 205, signal 210 assumes different values. In particular, when head 162 passes partially over one of servo window 168A along line 205, signal 210 assumes value $A''_3$, which is less than 50% of $A_1$. When head 162 passes partially over one of servo window 168B along line 205, signal 210 assumes value $A''_2$, which is less than $A_1$, but larger than 50% of $A_1$. Therefore, a controller of head 162 can determine whether to move head 162 up or down with respect to the centerline, in response to such off-track amplitude measurements based on the amplitude measurement and the corresponding width measurement associated with the amplitude. Such self-synchronization is highly desirable because it eliminates the need for additional synchronization marks, as well as manufacturing efforts associated with formation of additional synchronization marks.

Readout signal 210 also provides a measure of widths $W_1$ and $W_2$, which correspond to the widths of servo windows 168A and 168B, respectively. Because widths $W_1$ and $W_2$ are different from each other, a controller associated with head 162 can analyze readout signal 210 and determine that $A''_2$ is associated with a window below the centerline and $A''_3$ is associated with a window above the centerline. Thus, the controller can determine that head 162 is off-track and needs to be moved laterally downward. Again, synchronization marks are not needed because differing widths of windows 168A and 168B allows for self-synchronization.

Moreover, relative to centerline 165C or centerline 165E (labeled in FIG. 16), the readout signal would also reflect variance in width $W_1$, which can facilitate track identification as described herein. In particular, width $W_1$ would be reduced when head 162 moved over a line in close proximity to centerline 165C relative to width $W_1$ depicted in FIGS. 17, 19 and 21. Similarly, width $W_1$ would be further reduced when head 162 moved over a line in close proximity to centerline 165E. Accordingly, measurement of width $W_1$ may provide the ability to identify track locations without the need for conventional track identification marks, e.g., that cross one or more centerlines.

Figure 22:
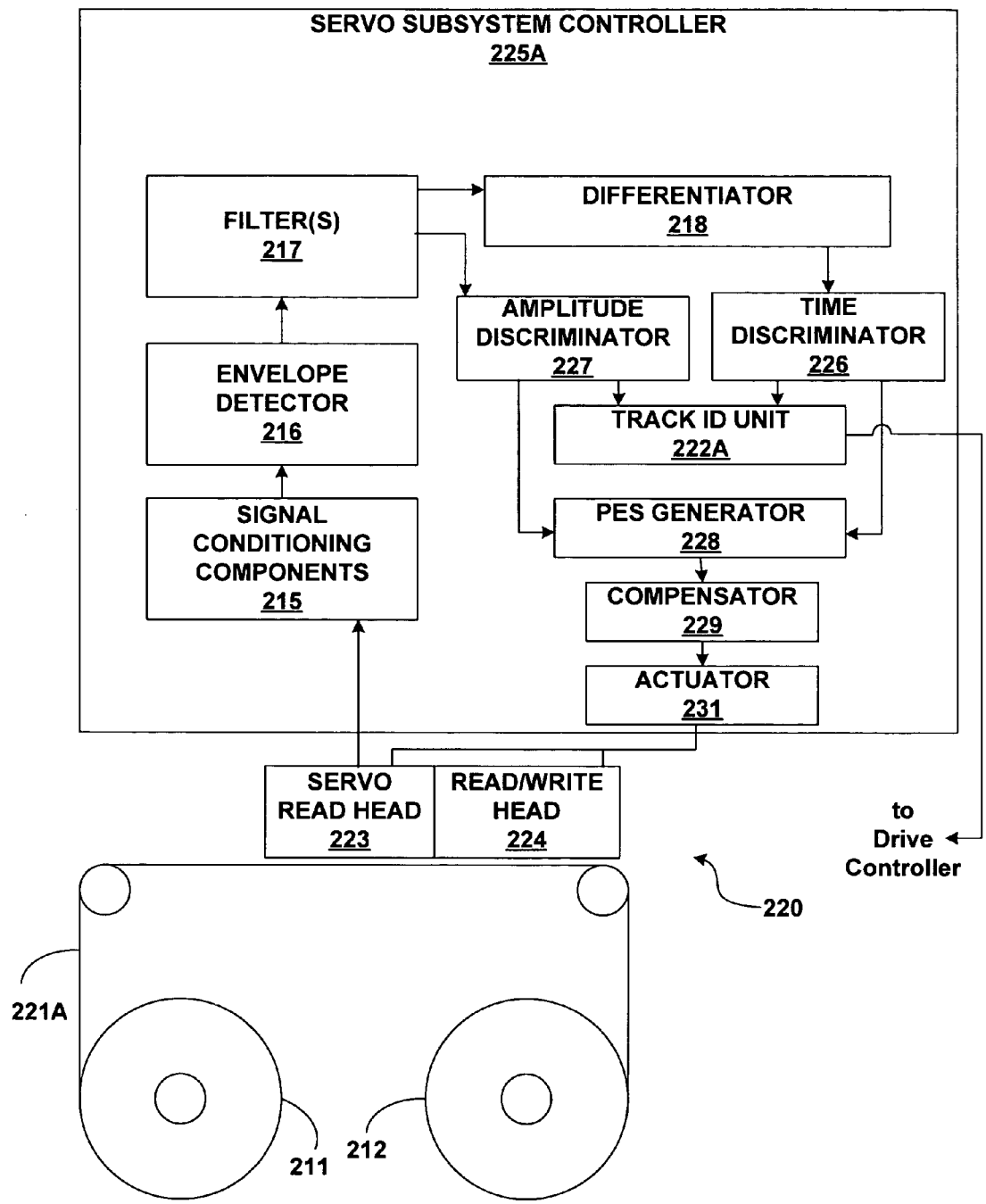
FIGS. 22 and 23 are block diagrams illustrating exemplary data storage systems according to embodiments of the invention.
Figure 23:
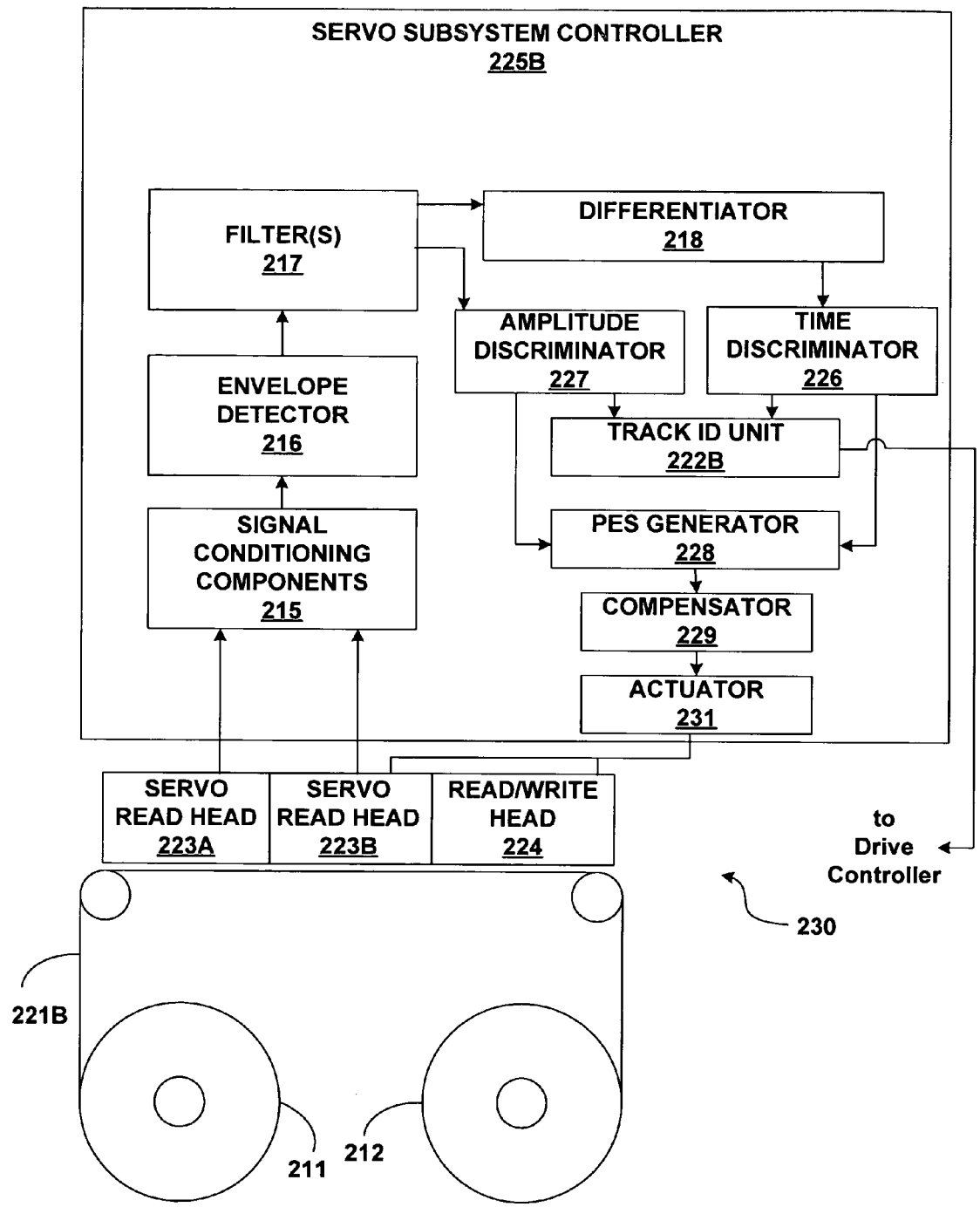

FIG. 22 is a block diagram of a system 220 comprising a data storage medium 221A in the form of magnetic tape, a servo read head 223, a data read/write head 224, and a servo subsystem controller 225A to control the positioning of heads 223, 224 relative to medium 221A. In some cases, multiple servo read heads similar to head 223 may be used in order to read differing patterns in adjacent servo bands, as described above, and thereby facilitate track identification. FIG. 22, however, relates to an embodiment making use of a single servo head 223, e.g., for reading a servo pattern similar to that illustrated in FIGS. 14, 15 or 16. In other words, medium 221A may correspond to medium 140 of FIG. 14, medium 150 of FIG. 15, medium 160 of FIG. 16, or the like. On the other hand, if servo patterns similar to those illustrated in FIGS. 4, 5A–5C, 9, 10 or 13 are used, two or more servo heads on a servo device would simultaneously read different tracks of the different servo bands. FIG. 23 is described below and provides more details of an embodiment for reading servo patterns similar to those illustrated in FIGS. 4, 5A–5C, 9, 10 or 13. In that case, all of the output signals would be sent to the controller for decoding and collective analysis as described above. In particular, collective signals of a track in a first servo band and a corresponding track in a second servo band can be decoded to facilitate track identification.

Referring to FIG. 22, medium 221A comprises magnetic tape spooled onto spools 211 and 212. In particular, medium 221A feeds from spool 211 to spool 212, passing in close proximity to servo head 223 and read/write head 224 for magnetic recording and/or readout. For example, medium 221A may contact heads 223, 224. Medium 221A generally corresponds to medium 140, 150 or medium 160 described above, and includes servo windows arranged to facilitate track identification and possibly synchronization.

Servo head 223 detects servo signal amplitudes in medium 221 and provides the detected signal to servo subsystem controller 225A. Signal conditioning components 215, such as amplifiers, pre-amplifiers, filters, or the like, condition the detected signal and provide the detected signal to envelope detector 216, which generates an envelope signal based on the detected and conditioned signal. The envelope signal is filtered by one or more filters 217, e.g., in order to round the corners of square waves in the envelope signal. Differentiator 218 generates pulses corresponding to the edges in the envelope signal. The pulses provide information regarding the measured amplitude of the signal and the distance between pulses provide information regarding the widths of the servo windows. Also, offsets between pulses of different windows may be used for track identification.

Amplitude discriminator 227 differentiates signal from noise by comparing the input signal to some fixed or variable threshold, such as 50% of the average peak amplitude, and time discriminator 226 measures the timing between pulses in order to estimate the widths of the servo windows. Track identification (ID) unit 222A identifies the track being read based on widths of servo windows or offsets between servo windows of the track being read and provides such information to a drive controller. Position error signal (PES) generator 228 receives input from amplitude discriminator 227 and time discriminator 226 and generates position error signals based on the measured amplitudes and widths, and provides the position error signals to compensator 229.

Compensator 229 generates signals to adjust the lateral positioning of heads 223, 224 relative to medium 221A in order to achieve on-track positioning of heads 223, 224 relative to medium 221A. Actuator 231 applies the signals of compensator 229 in order to control movement of heads 223, 224 relative to medium 221A. In this manner, servo subsystem controller 225A uses servo patterns on medium 221A, identifies the track being read, and provides feedback control of positioning of heads 223, 224 relative to medium 221A based on the detected servo patterns.

System 230 of FIG. 23 operates very similarly to system 220 of FIG. 22 and includes many similar components that operate as outlined above. System 230, however, would be used if servo patterns similar to those illustrated in FIGS. 4, 5A–5C, 9, 10 or 13 are read. In other words, medium 221B may include servo patterns similar to those illustrated in FIGS. 4, 5A–5C, 9, 10 or 13. In that case, two or more servo heads 223A, 223B are disposed on a servo device for simultaneous reading of different tracks of the different servo bands. The output signals of the different servo heads 223A, 223B would be sent to servo subsystem controller 225B for decoding similar to that described above with reference to FIG. 22. However, the collective outputs of both servo heads 223A and 223B would also be analyzed, e.g., by a track ID unit 222B. The track ID unit 222B, for example, would discern track identification based on offsets between servo windows of the different bands of medium 221B, as described herein.

For both of FIGS. 22 and 23, the output of track ID unit 222A or 222B is provided to a drive controller, which is the master controller for system 220 or 230. For example, the drive controller generally controls data communication between either of systems 220 or 230 and a host computer, and also controls such things as tape and motor speeds and the addressing of data on the medium. Accordingly, the drive controller may use the track identification information discerned by track ID unit 222A or 222B in order to address the data to specific tracks and keep track of such addressing in order to enable retrieval of the data.

By way of example, further details of the operation of a servo system will now be provided with reference to system 220 of FIG. 22. It is understood that system 230 of FIG. 23 would operate in a similar manner, duplicating the processing of signals from the two different servo heads 223A, 223B, and then using offsets between the signals of different bands for track identification purposes.

Figure 24:
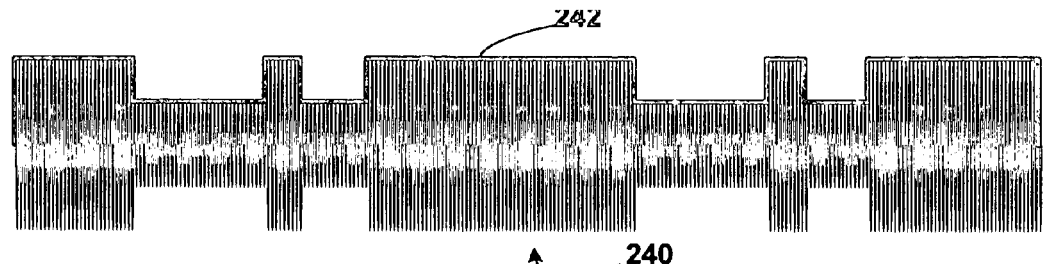
FIG. 24 illustrates a readout signal and a corresponding envelope signal that may be generated when a servo read head passes relative to a servo track substantially along a centerline of a servo track.
Figure 25:
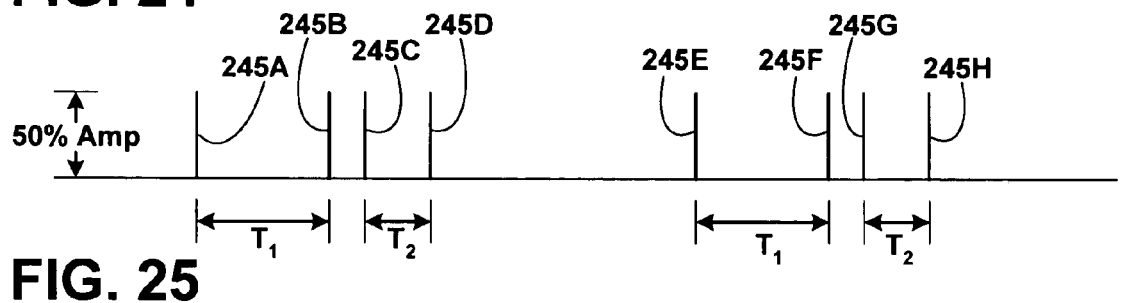
FIG. 25 illustrates pulses that can be generated based on the envelope signal illustrated in FIG. 24.

FIG. 24 illustrates a readout signal 240, that may be generated when servo head 233 passes relative to a servo track substantially along centerline 165A (FIG. 16). Based on signal 240, envelope detector 216 generates envelope signal 242. Then, following filtering by filter 217, differentiator 218 generates pulses 245A–245H (collectively pulses 245) as shown in FIG. 25, corresponding to the edges in envelope signal 242.

Amplitude discriminator 227 differentiates signal from noise by comparing the input signal to some fixed or variable threshold, such as 50% of the average peak amplitude, and time discriminator 226 measures the timing ($T_1$ and $T_2$) between pulses in order to estimate the widths of servo windows 168A, 169A (FIG. 16). Track ID unit 222A identifies the track being read based on widths estimated by timing ($T_1$ and $T_2$), or offsets between the pulses corresponding to different servo windows.

Position error signal (PES) generator 228 generates position error signals based on the measured amplitudes and widths, and provides the position error signals to compensator 229. Compensator 229 uses the position error signals to generate adjustment signals for actuator 231, which adjusts lateral positioning of heads 223, 224 relative to medium 221A in order to achieve on-track positioning of heads 223, 224 relative to medium 221A. In this case, actuator 231 does not adjust the lateral positioning of heads 223, 224 because signal 240, signal 242, and corresponding pulses 245 indicate that positioning is exactly on track (or at least within the minimum position error measurement tolerance of the system).

Figure 26:
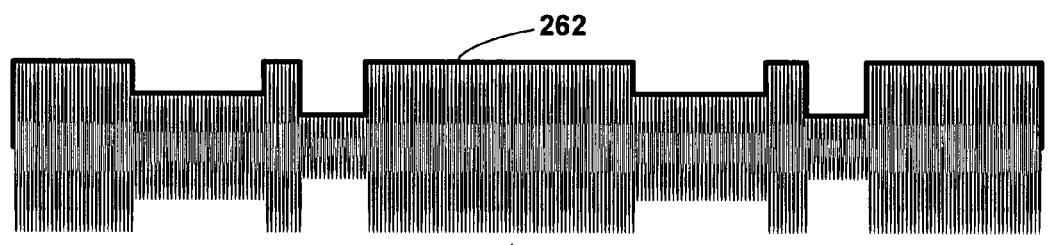
FIG. 26 illustrates a readout signal and a corresponding envelope signal that may be generated when servo head passes relative to a servo track slightly below a centerline of a servo track.
Figure 27:
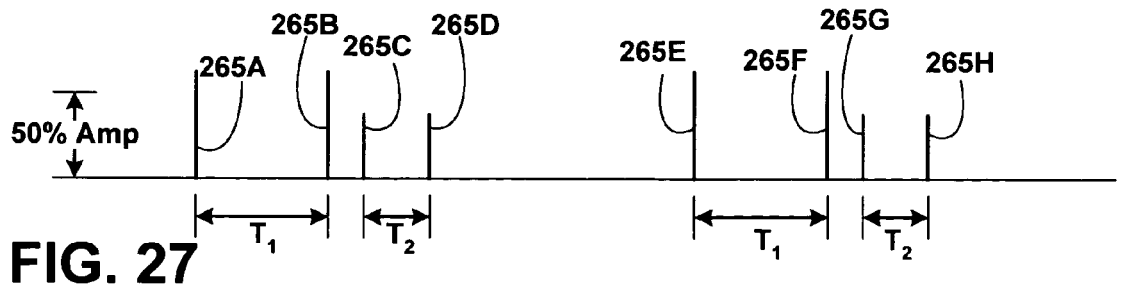
FIG. 27 illustrates pulses that can be generated based on the envelope signal illustrated in FIG. 26.

FIG. 26 illustrates a readout signal 260, that may be generated when servo head 223 passes relative to a first track below centerline 165A (FIG. 16). Based on signal 260, envelope detector 216 generates envelope signal 262. Then, following filtering by filter 217, differentiator 228 generates pulses 265A–265H (collectively pulses 265) as shown in FIG. 27, corresponding to the edges in envelope signal 262.

Amplitude discriminator 227 differentiates signal from noise by comparing the input signal to some fixed or variable threshold, such as 50% of the average peak amplitude, and time discriminator 226 measures the timing ($T_1$ and $T_2$) between pulses in order to estimate the widths of servo windows 168A, 169A (FIG. 16) on medium 221A. Track ID unit 222A identifies the track being read based on widths estimated by timing ($T_1$ and $T_2$), or offsets between the pulses corresponding to different servo windows.

Position error signal (PES) generator 228 generates position error signals based on the measured amplitudes, and provides the position error signals to compensator 229. Compensator 229 uses the position error signals to generate adjustment signals for actuator 231, which adjusts lateral positioning of heads 223, 224 relative to medium 221A in order to achieve on-track positioning of heads 223, 224 relative to medium 221A.

In this case, actuator 231 causes heads 223, 224 to move upward because signal 260, signal 262, and corresponding pulses 265 indicate that positioning of heads 223, 224 is below centerline 165A (FIG. 16). Servo subsystem controller 225B is programmed to recognize, for every given servo track, which of the larger and smaller servo windows resides above or below the centerline for that given track. For this reason, differently sized servo windows enable self synchronization, without the need for additional synchronization marks in the servo pattern. Also, differently sized servo windows may facilitate track identification.

Figure 28:
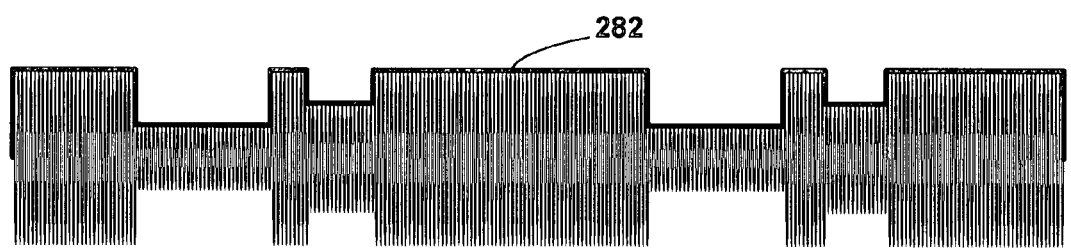
FIG. 28 illustrates a readout signal and a corresponding envelope signal that may be generated when a servo head passes relative to a servo track slightly above a centerline of a servo track.
Figure 29:
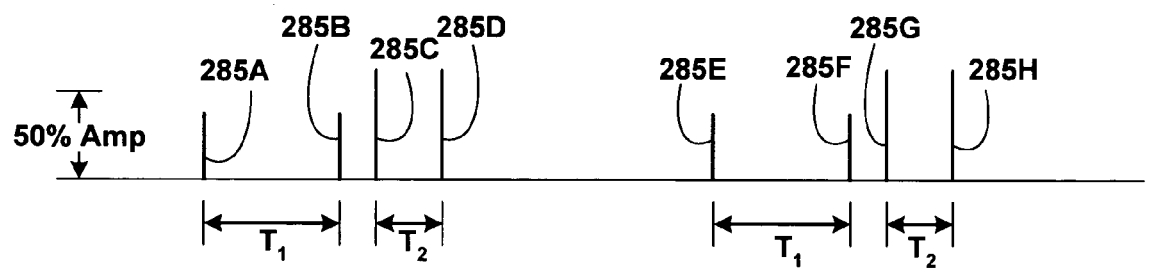
FIG. 29 illustrates pulses that can be generated based on the envelope signal illustrated in FIG. 28.

FIG. 28 illustrates a readout signal 280, that may be generated when servo head 223 passes slightly above centerline 165A (FIG. 16). Based on signal 280, envelope detector 226 generates envelope signal 282. Then, following filtering by filter 217, differentiator 218 generates pulses 285A–285H (collectively pulses 285) as shown in FIG. 29, corresponding to the edges in envelope signal 282.

Amplitude discriminator 227 differentiates signal from noise by comparing the input signal to some fixed or variable threshold, such as 50% of the average peak amplitude, and time discriminator 226 measures the timing ($T_1$ and $T_2$) between pulses in order to estimate the widths of servo windows 168A, 169A (FIG. 16) on medium 221A. Track ID unit 222A identifies the track being read based on widths estimated by timing ($T_1$ and $T_2$), or offsets between the pulses corresponding to different servo windows.

Position error signal (PES) generator 228 generates position error signals based on the measured amplitudes, and provides the position error signals to compensator 229. Compensator 229 uses the position error signals to generate adjustment signals for actuator 231, which adjusts lateral positioning of heads 223, 224 relative to medium 221A in order to achieve on-track positioning of heads 223, 224 relative to medium 221A. In this case, actuator 231 causes heads 223, 224 to move laterally downward because signal 280, signal 282, and corresponding pulses 285 indicate that positioning of heads 223, 224 is below centerline 165A (FIG. 16). Again, servo subsystem controller 225A is programmed to recognize for every given track, which of the larger and smaller servo windows resides above or below the centerline for that given track, thereby allowing for self synchronization without the need for additional synchronization marks in the servo pattern. Also, differently sized servo windows may facilitate track identification.

Figure 30:
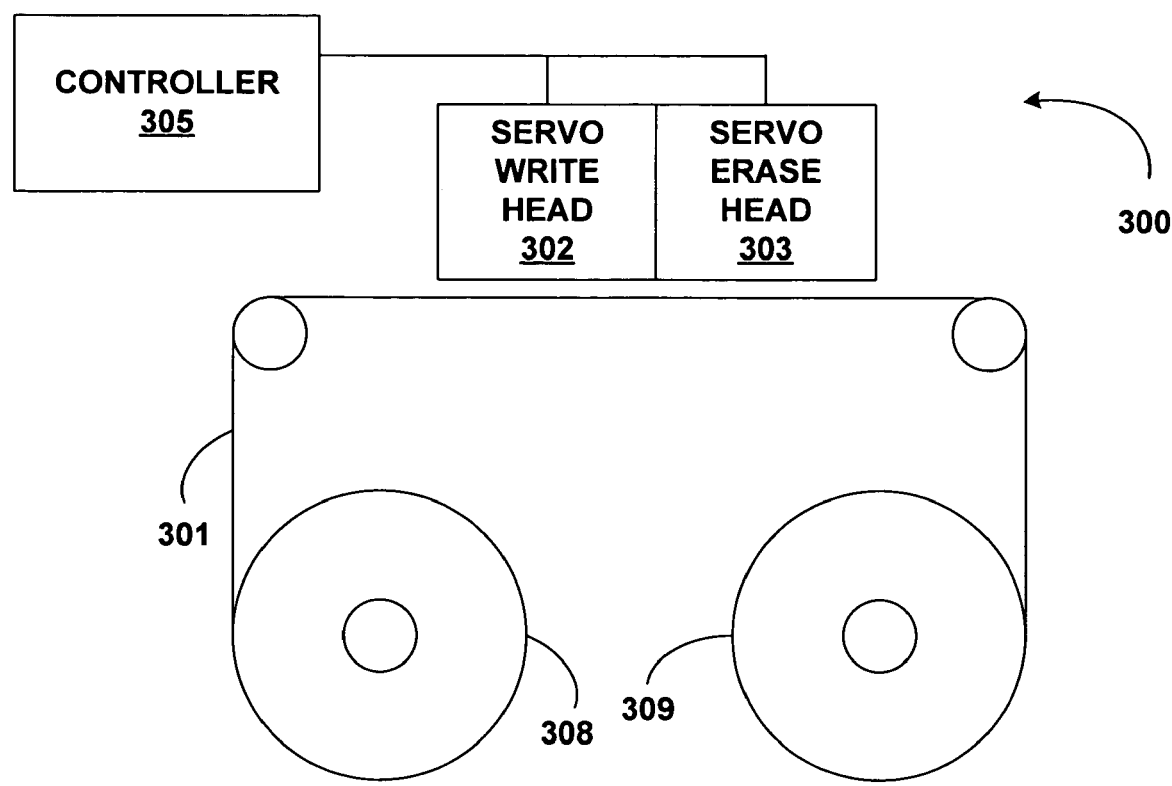
FIG. 30 is a block diagram illustrating an exemplary servo writing device for pre-recording servo patterns on a data storage medium as described herein.

FIG. 30 illustrates an exemplary servo writing device 300 for pre-recording servo patterns on medium 301 as described herein. Medium 301 comprises magnetic tape spooled onto spools 308 and 309 and can be recorded with servo patterns using servo writing device 300. Servo writing device 300 includes a servo write head 302, a servo erase head 303, and a controller 305 to control the magnetic fields applied by heads 302, 303. Medium 301 feeds from spool 308 to spool 379, passing in close proximity to heads 302, 303. For example, medium 301 may contact heads 302, 303 during recording.

Heads 302, 303 comprise electromagnetic elements that generate magnetic fields. Controller 305 causes servo write head 302 to write a periodic pattern substantially over the full servo band associated with medium 301. Then, controller 305 causes servo erase head 303 to selectively erase servo windows above and below centerlines of the various tracks within the servo band. In accordance with the invention, the patterns of servo windows are arranged to facilitate inherent track identification and possibly synchronization without the need for conventional synchronization marks or track identification marks that span across centerlines of the tracks. In some cases, different arrangements of servo patterns are created for different servo bands. Offsets between servo windows of one track are different than offsets between servo windows of another track. In some cases, widths of the servo windows may vary. In these ways, the patterns of servo windows can be arranged to facilitate inherent track identification and possibly inherent synchronization.

Figure 31:
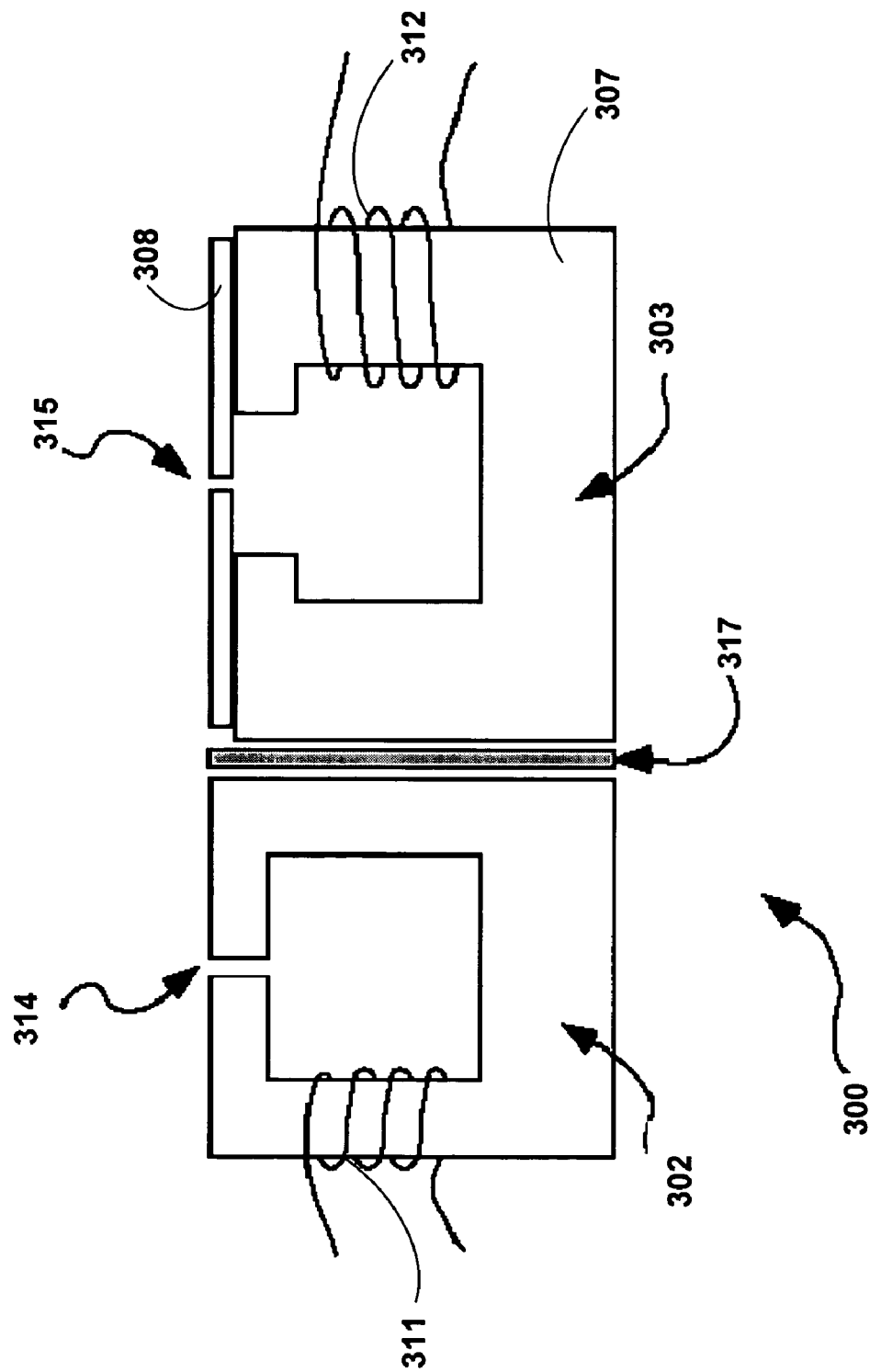
FIG. 31 is a cross-sectional conceptual view of an exemplary servo write head and a servo erase head that form a servo writing device.

FIG. 31 is a cross-sectional conceptual view of an exemplary servo write head 302 and a servo erase head 303 that form a servo writing device 300. A magnetic shield 317 may be positioned between servo write head 302 and servo erase head 303 in order to eliminate electrical or magnetic interaction between the heads. Again, heads 302, 303 comprise electromagnetic elements to generate magnetic fields. In particular, controller 305 (FIG. 30) applies electrical signals to heads 302, 303 via coils 311, 312 in order to cause heads 302 to generate magnetic fields across gaps 314, 315. For example, a periodic electrical signal may be applied to head 302 via coil 311 in order to generate an oscillating magnetic field across gap(s) 314. Gap(s) 314 may be formed directly in an electromagnetic element to define head 302. Gap(s) 314 may be relatively wide in the cross-tape direction such that the magnetic signal can be recorded over a full surface of the servo bands.

Controller 305 also applies an electrical signal to head 303 via coil 312 in order to generate a magnetic field across gap(s) 315. In particular, a direct current electrical signal may be applied to head 303, or alternatively, an alternating signal of substantially different frequency than that applied to head 302 may be applied to head 303. In either case, gaps 315 are arranged to define the servo pattern. In particular, head 303 may comprise an electromagnetic element 307 and a magnetic layer 308 formed over electromagnetic element 307. The magnetic layer 308 may be formed or etched to define a pattern of gaps, that in turn define the servo pattern. For example, magnetic layer 308 may comprise a magnetically permeable layer that is deposited over electromagnetic element 307 via masking techniques to define patterns of gaps. Alternatively, magnetic layer 308 may comprise a magnetically permeable layer that is deposited over electromagnetic element 307 and then etched to define patterns of gaps. Also, magnetic layer 308 may be preformed to define the gaps and then adhered to electromagnetic element 307 to define head 303.

Figure 32:
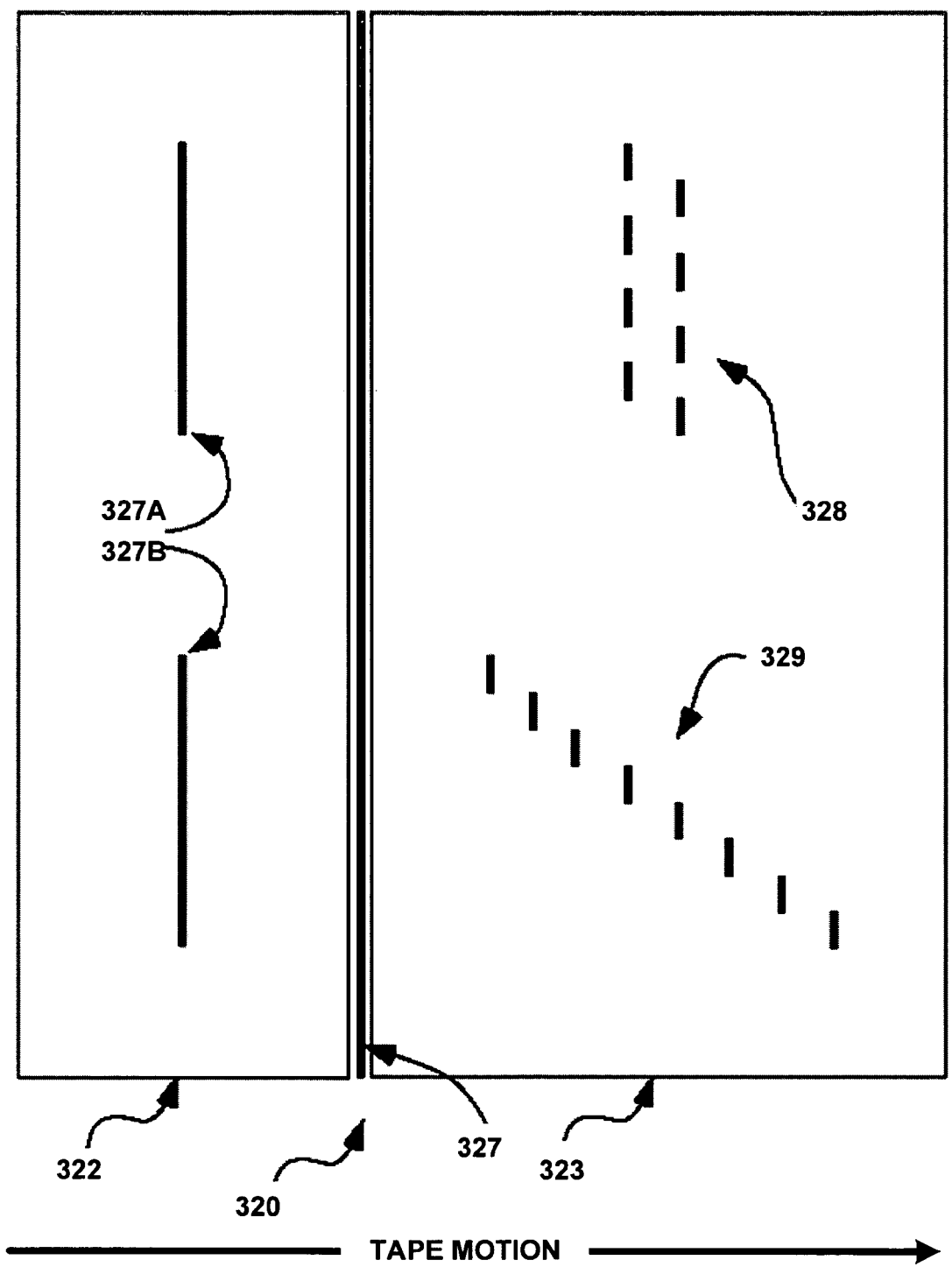
FIG. 32 is a top view of an exemplary servo writing device comprising a servo write head and a servo erase head separated by a magnetic shield.

FIG. 32 is a top view of an exemplary servo writing device 320 comprising a servo write head 322 and a servo erase head 323 separated by a magnetic shield 327. Servo writing device 320 illustrated in FIG. 32 may correspond to servo writing device 300 illustrated in FIGS. 30 and 31. Servo write head 322 and servo erase head 323 are configured to simultaneously record different servo patterns corresponding to different servo bands on a medium. In particular, heads 322 and 323 may be used to create servo patterns similar to those of bands 41A and 41B of FIG. 4. Servo write head 322 includes two relatively wide gaps 327A and 327B. Servo erase head 323 includes sets of gaps 328, 329, e.g., formed in a magnetic layer over an electromagnetic element. If desired additional wide gaps may be formed on servo write head 322 and additional sets of gaps may be formed on servo erase head 323 for simultaneous creation of servo patterns of additional servo bands.

As illustrated in FIG. 32, servo erase head 323 includes a first set of gaps 328 formed over the electromagnetic element to define a first magnetic field pattern corresponding to a first servo band on a magnetic medium, and a second set of gaps 329 formed over the electromagnetic element to define a second magnetic field pattern corresponding to a second servo band on the magnetic medium. First set of gaps 328 is arranged differently than the second set of gaps 329. In this example, first set of gaps 328 is arranged in a checkerboard-like configuration and second set of gaps 329 is arranged in a stepped configuration.

In operation, a generally continuous magnetic signal generated by servo write head 322 at gaps 327A, 327B to record magnetic signals over servo bands of a medium as the medium passes relative to heads 322, 323. The servo controller applies electrical pulses to servo erase head 323 to generate timed bursts of magnetic signals at sets of gaps 328, 329 as the medium passes relative to heads 322, 323. With the medium moving relative to heads 322, 323, the timed bursts of magnetic signals at sets of gaps 328, 329 create sets of servo windows similar to those illustrated in bands 41A and 41B of FIG. 4.

Figure 33:
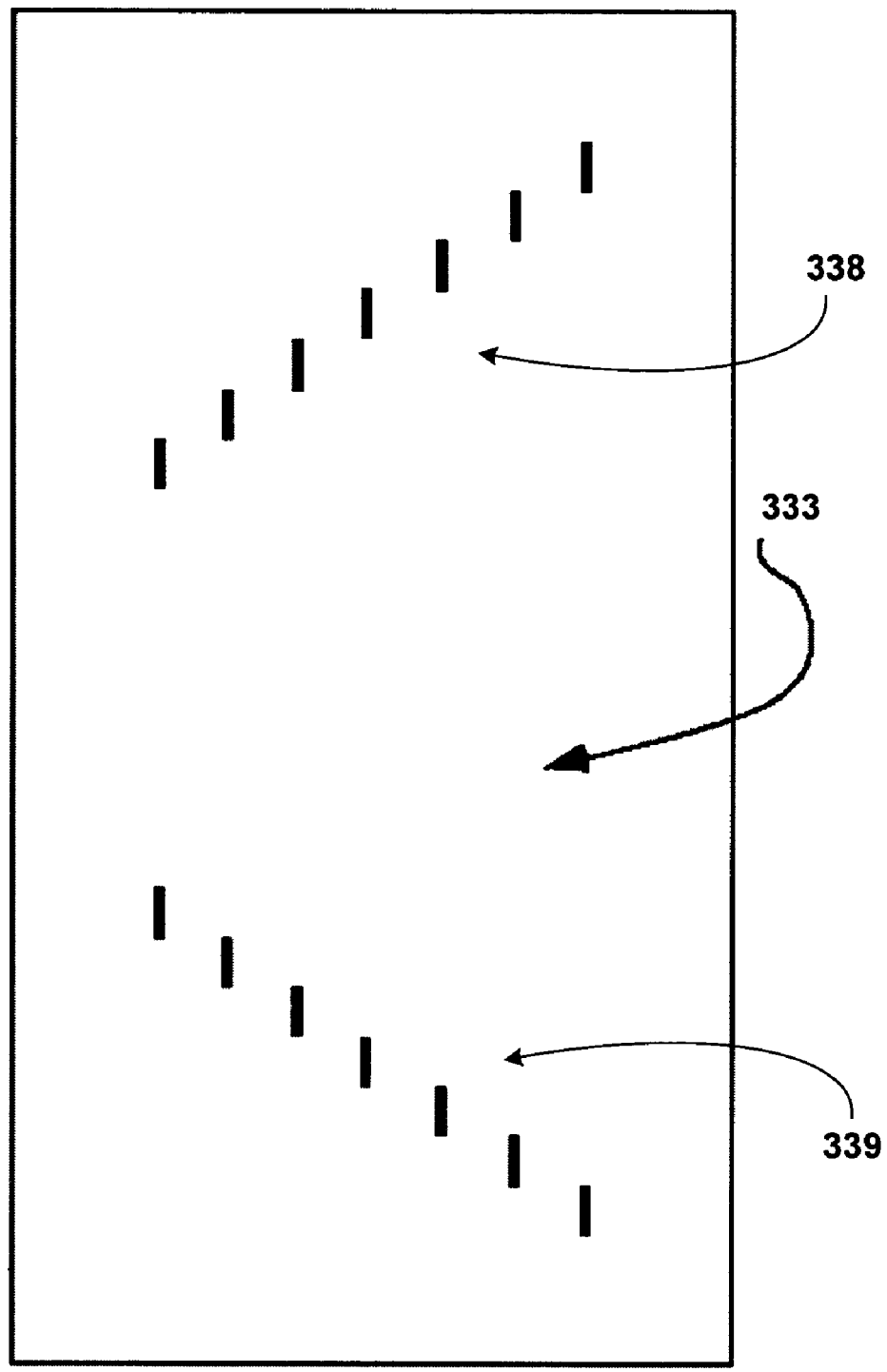
FIG. 33 is a top view of another servo erase head according to an embodiment of the invention.

FIG. 33 is an alternative top view of a servo erase head 333 includes a first set of gaps 338 formed over the electromagnetic element to define a first magnetic field pattern corresponding to a first servo band on a magnetic medium, and a second set of gaps 339 formed over the electromagnetic element to define a second magnetic field pattern corresponding to a second servo band on the magnetic medium. First set of gaps 338 is arranged differently than the second set of gaps 339. In this example, first set of gaps 338 is arranged in an upward stepped configuration and second set of gaps 339 is arranged in a downward stepped configuration. Servo erase head 333 may form part of a servo device that also includes a servo write head. Such a servo writing device may be used to create sets of servo windows similar to those illustrated in bands 91A and 91B of FIG. 9. For each set of gaps 338, 339, centerlines of tracks for the servo band are defined between each step in the stepped configuration of the gaps.

Figure 34:
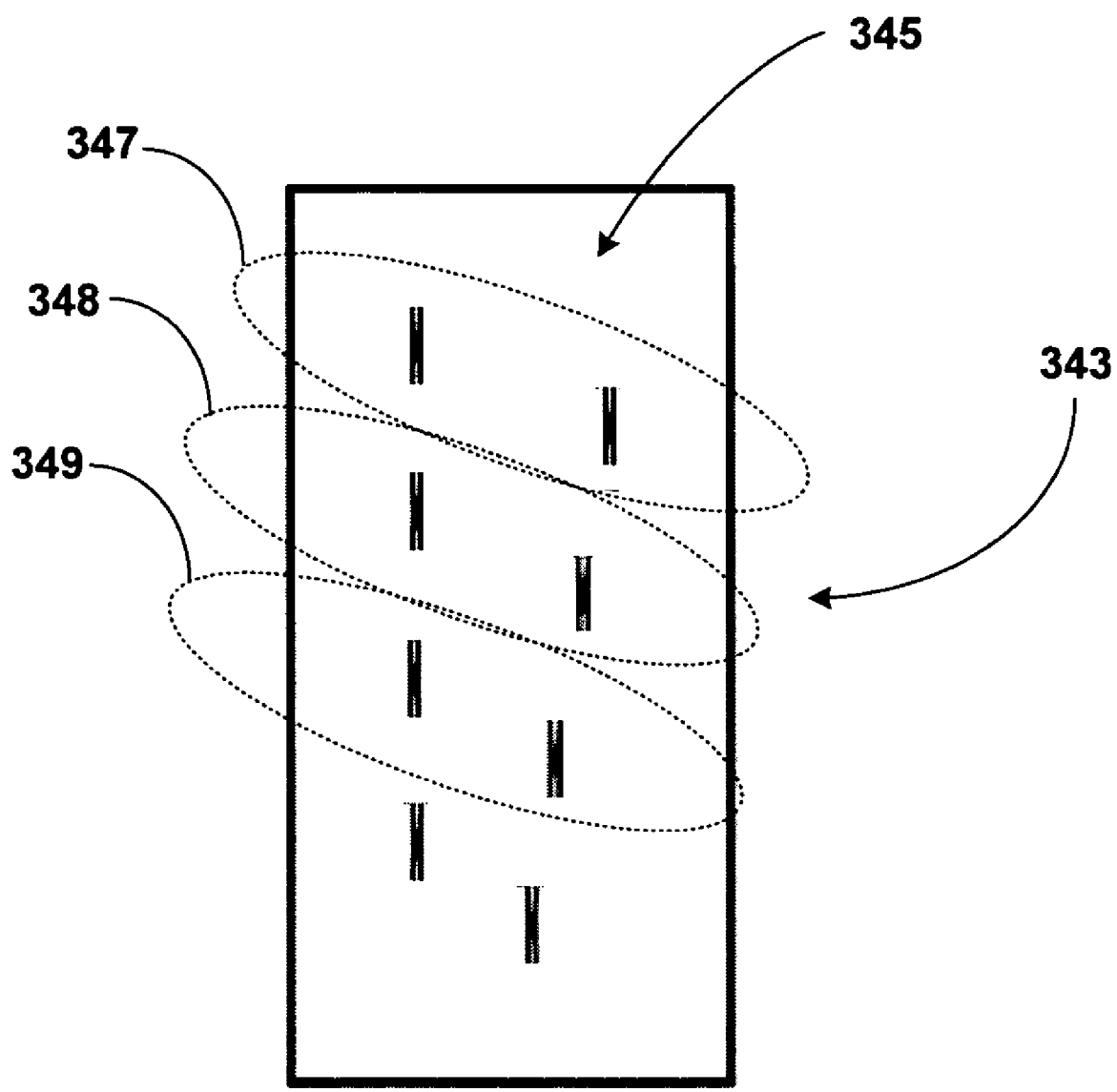
FIG. 34 is a top view of another servo erase head according to an embodiment of the invention.

FIG. 34 is another alternative top view of a servo erase head 343 in accordance with an embodiment of the invention. Servo erase head 343 may form part of a servo device that also includes a servo write head. Such a servo writing device may be used to create sets of servo windows similar to those illustrated in FIG. 14. Servo erase head 343 includes an electromagnetic element (not shown) to generate a magnetic field. A set of gaps 345 is formed over the electromagnetic element to define a magnetic field pattern corresponding to a servo band on a magnetic medium. If desired, each of the gaps may include oval shaped terminators on the ends of the gaps, which can improve the quality of the magnetic fields which permeate from the gaps. Such terminators on the gaps may be used in gaps of any of the heads described herein.

The set of gaps 345 is arranged to define a first subset of gaps 347 positioned above and below a location corresponding to a first centerline of the servo band and corresponding to a first servo track, a second subset of gaps 348 positioned above and below a location corresponding to a another centerline (the third centerline) and corresponding to a the third servo track of the servo band, and a third subset of gaps 349 positioned above and below a location corresponding to yet another centerline of the servo band (the fifth centerline) and corresponding to the fifth servo track of the servo band. The first subset of gaps 347, the second subset of gaps 348, and the third subset of gaps 349 are unique relative to one another. In particular, the distance between gaps in the first subset 347, second subset 348 and third subset 349 differ such that offsets between servo window created by gaps 345 will differ for the different servo tracks.

Figure 35:
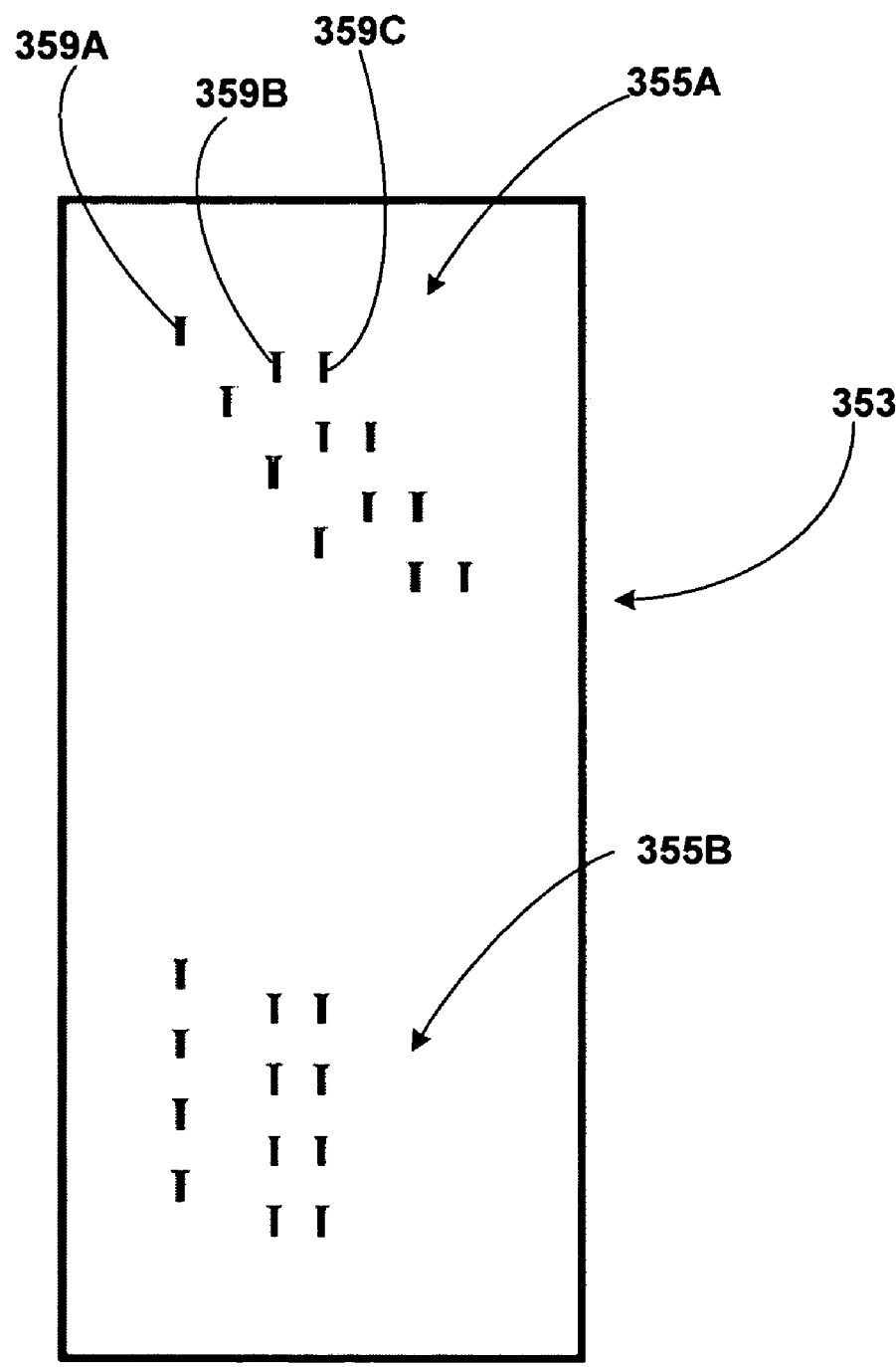
FIG. 35 is a top view of another servo erase head according to an embodiment of the invention.

FIG. 35 is another alternative top view of a servo erase head 353 in accordance with an embodiment of the invention. Servo erase head 353 may form part of a servo device that also includes a servo write head. Such a servo writing device may be used to create sets of servo windows on magnetic tape as describe herein. Servo erase head 353 includes an electromagnetic element (not shown) to generate a magnetic field. Sets of gaps 355A, 355B are formed over the electromagnetic element to define magnetic field pattern corresponding to two servo bands on a magnetic medium. The arrangements of sets of gaps 355A, 355B differ relative to one another.

The sets of gaps 355A and 355B are arranged to define subsets of gaps positioned above and below locations corresponding first centerlines of the servo bands. For example subset of gaps 359A, 359B and 359C correspond to a first servo track of a first servo band. In accordance with the invention, some of the created servo windows will have larger widths than other servo windows. In particular, individual gaps of different subsets may be displaced from one another in a manner that defines the widths of created servo windows. Gaps 359B and 359C collectively create one servo window that is wider than a servo window created by gap 359A. The different sets of gaps 355A and 355B may also be formed on servo erase heads without the other set in order to create a single servo band on a medium. As with any servo erase head embodiment described herein, the number of sets of gaps (and thus number of servo bands being created) is subject to a wide variety of implementations. For example, a write head may include any number of gaps to record servo band signals, and any number of sets of erase gaps may be included to define erased servo windows.

Figure 36:
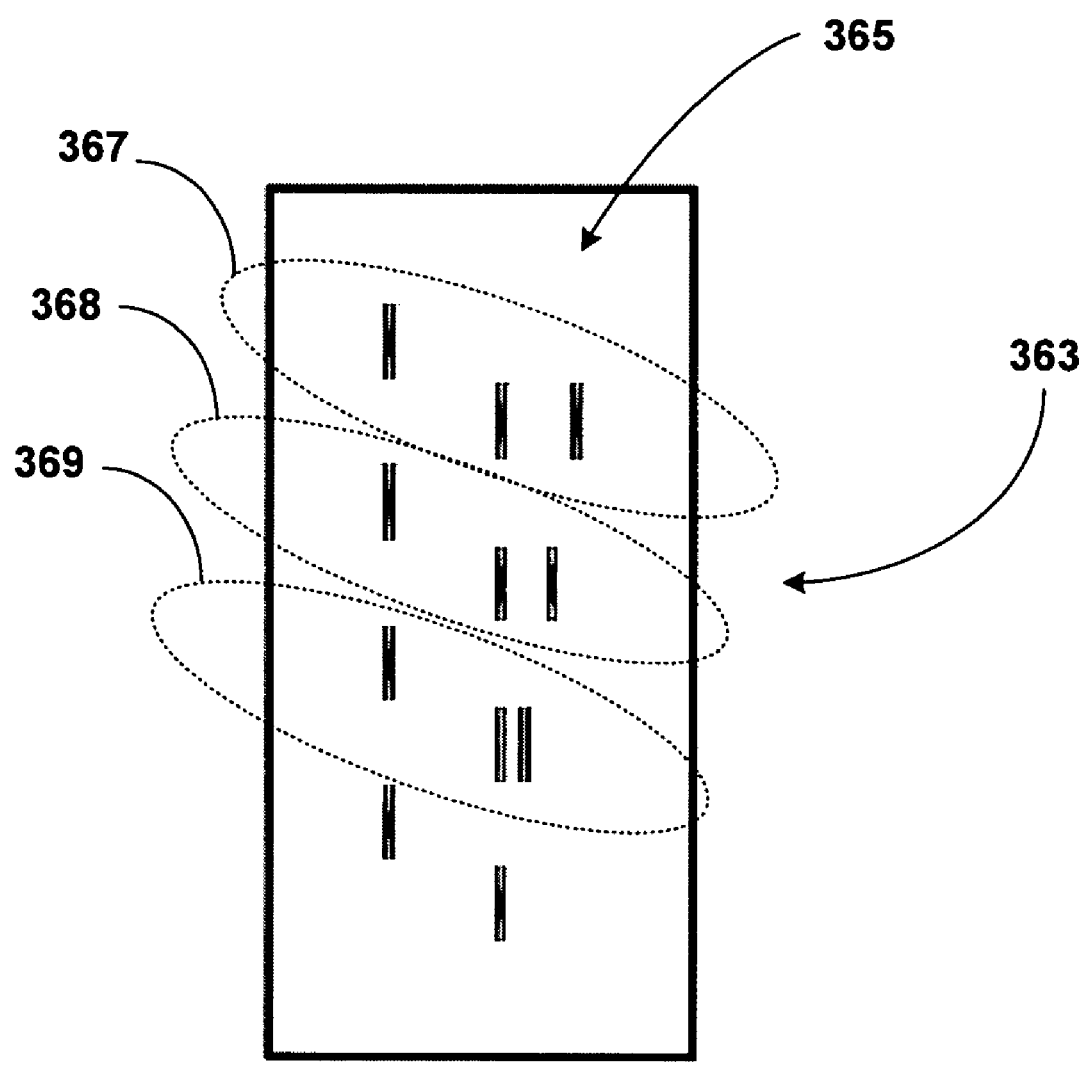
FIG. 36 is a top view of another servo erase head according to an embodiment of the invention.

FIG. 36 is another alternative top view of a servo erase head 363 in accordance with an embodiment of the invention. Servo erase head 363 may form part of a servo device that also includes a servo write head. Such a servo writing device may be used to create sets of servo windows similar to those illustrated in FIG. 15. Servo erase head 363 includes an electromagnetic element (not shown) to generate a magnetic field. A set of gaps 365 is formed over the electromagnetic element to define a magnetic field pattern corresponding to a servo band on a magnetic medium.

The set of gaps 365 is arranged to define a first subset of gaps 367 positioned above and below a location corresponding to a first centerline of the servo band and corresponding to a first servo track, a second subset of gaps 368 positioned above and below a location corresponding to a third centerline and corresponding to a third servo track of the servo band, and a third subset of gaps 369 positioned above and below a location corresponding to a fifth centerline of the servo band and corresponding to a fifth servo track of the servo band. The first subset of gaps 367, the second subset of gaps 348, and the third subset of gaps 369 are unique relative to one another. In particular, the distance between gaps in the first subset 367, second subset 368 and third subset 369 differ such that widths of at least some of the servo windows created by gaps 345 will differ for the different servo tracks. In particular, individual gaps of different subsets may be displaced from one another in a manner that defines the widths of created servo windows.

Figure 37:
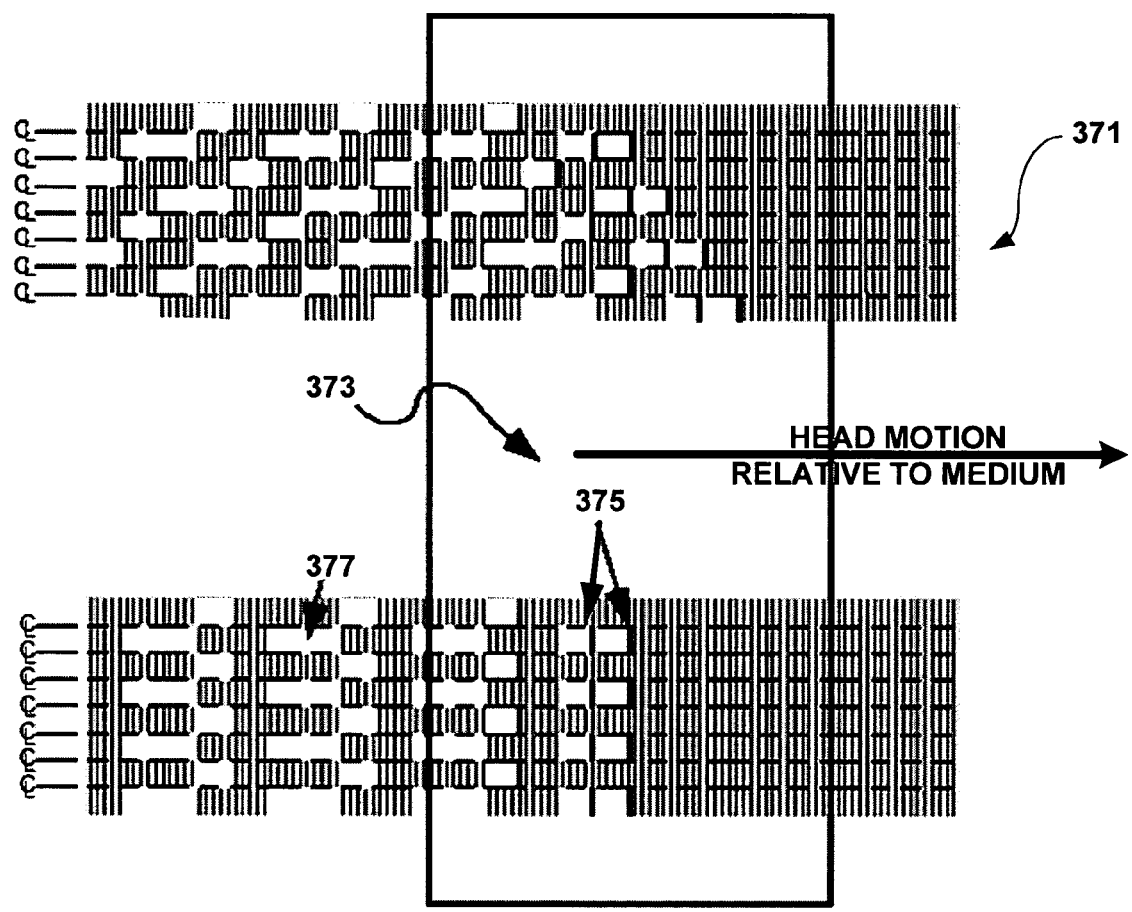
FIG. 37 illustrates a servo erase head similar to that of FIG. 35 passing over a medium to erase servo windows in the medium.

FIG. 37 illustrates a servo erase head 373 similar to servo head 353 (FIG. 35) passing over a medium 371 to erase servo windows in medium 371. As medium 371 passes relative to head 373, a timed pulse of electrical current is delivered to head 373. The timed pulse creates magnetic fields to define the servo windows. The timed pulse has a duration that, in conjunction with motion of medium 371, defines a servo window width for each gap of servo erase head 373. In some cases, two or more gaps collectively define servo windows having widths larger than those servo windows defined by a single gap. For example, gaps 375 work together to create a servo window 377 that is wider than windows created by a single gap. Medium 371 may comprise magnetic tape that typically passes relative to head 373 at a rate between approximately 0.1 meter per second and 30 meters per second, although any tape speed could be used. The duration of the time pulse of electrical current delivered to head 373 may be dependent on the tape speed and may be in the range of 0.5 to 300 micro-seconds, although the invention is not necessarily limited in that respect. In accordance with the invention, gaps 373 can be defined in a layer formed over an electromagnetic element as described herein. Accordingly, separate current sources are not required for each individual gaps, but rather a common current source creates the pattern of magnetic fields via gaps 375. The same exemplary tape speed and pulse duration times mentioned above may also apply to the other heads described herein, e.g., the heads described with reference to FIGS. 30–36 having other arrangements of gaps formed on a layer over an electromagnetic element.

Figure 38:
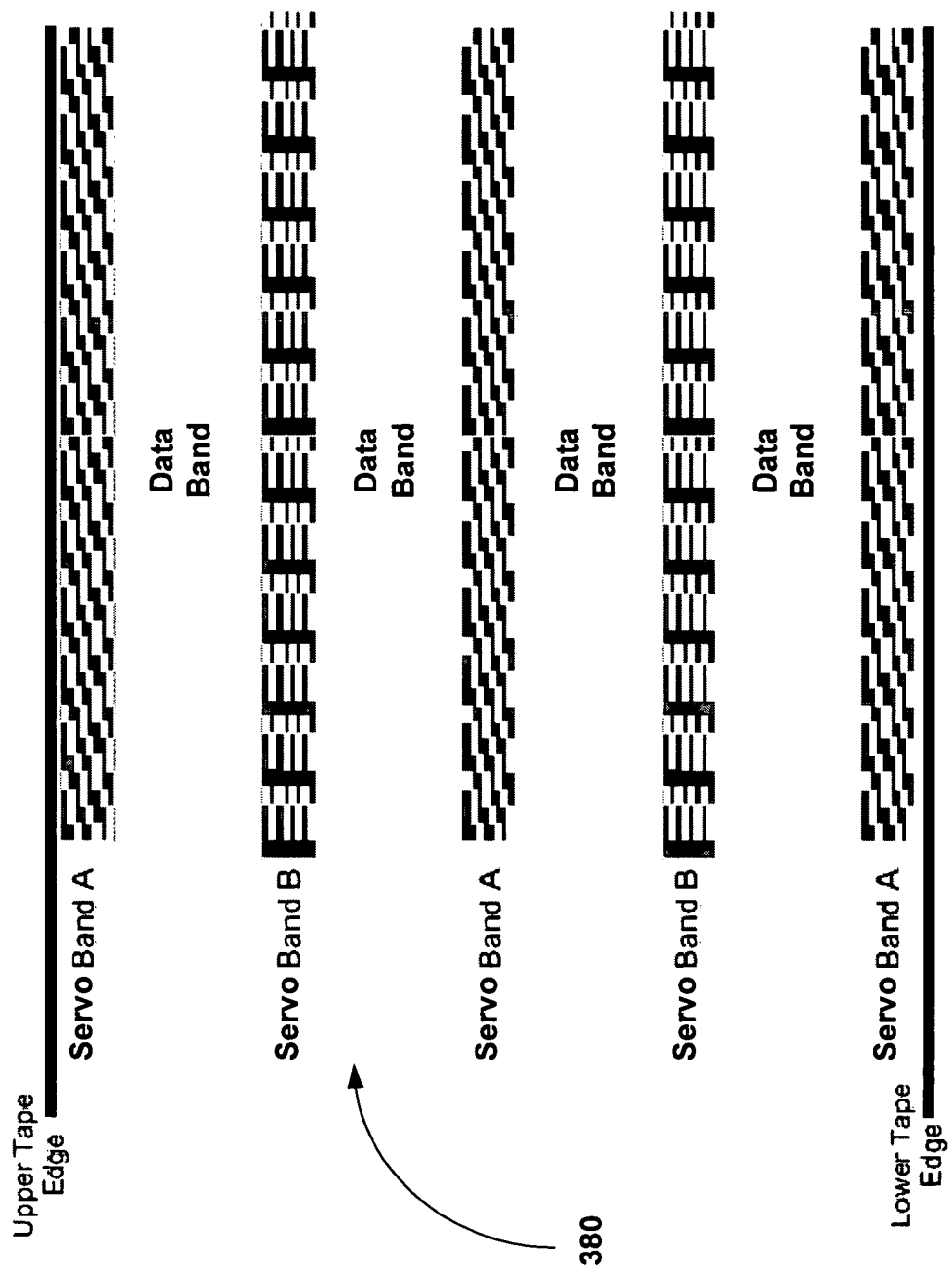
FIG. 38 is a depiction of a medium including a plurality of servo bands and data bands between the servo bands.

FIG. 38 is a depiction of medium 380 including a plurality of servo bands and data bands between the servo bands. In accordance with the invention, any number of servo bands may be created. The servo writing devices described above may be modified to include any number of sets of gaps needed to simultaneously create the servo patterns of the different bands. Any of the servo bands of medium 380 may include various arrangements of servo windows described herein. In some cases, the arrangements of different bands are different in order to facilitate track identification. For example, the arrangements of servo windows of different bands may alternate, with every other servo band having a similar pattern, but adjacent servo bands defining different patterns.

A number of embodiments of the invention have been described. For example, numerous different servo patterns comprising amplitude-based servo windows have been described. Moreover, servo head configurations and techniques for recording such patterns have also been described. Nevertheless, various modifications may be made without departing from the scope of the invention. For example, the servo windows could be written with signals, rather than erased, as outlined herein. In addition, the invention could be used with other media that makes use of pre-recorded servo patterns, such as magnetic disks, holographic media, or the like. Accordingly, other embodiments are within the scope of the following claims.

The invention claimed is:

1. A data storage medium comprising:
 a first servo band including a first set of amplitude-based servo windows, wherein the first set of amplitude-based servo windows defines a first set of servo tracks in the first servo band; and
 a second servo band including a second set of amplitude-based servo windows, wherein the second set of amplitude-based servo windows defines a second set of servo tracks in the second servo band, and wherein the second set of amplitude-based servo windows is arranged differently than the first set of amplitude-based servo windows.

2. The data storage medium of claim 1, wherein the data storage medium is magnetically recorded with a signal and the first and second sets of amplitude-based servo windows comprise erase windows where the magnetically recorded signal has been erased from the data storage medium.

3. The data storage medium of claim 1, further comprising a plurality of servo frames along the first and second servo bands, wherein each of the servo frames includes respective first and second sets of amplitude-based servo windows.

4. The data storage medium of claim 3, wherein the medium does not include any track identification marks between, servo frames of the servo bands.

5. The data storage medium of claim 1, wherein the first set of amplitude-based servo windows and the second set of amplitude-based servo windows are arranged such that a given servo track in the first set and a corresponding servo track in the second set collectively define a unique output signal relative to a collective output associated with other servo tracks in the first set and corresponding other servo tracks in the second set.

6. The data storage medium of claim 1, wherein the first set of amplitude-based servo windows is arranged in a checkerboard-like configuration and the second set of amplitude-based servo windows is arranged in a stepped configuration.

7. The data storage medium of claim 1, wherein the first set of amplitude-based servo windows is arranged in an upward stepped configuration relative to a traverse direction of the medium, and the second set of amplitude-based servo windows is arranged in a downward stepped configuration relative to the traverse direction.

8. The data storage medium of claim 1, wherein each of the tracks in the first servo band defines a centerline, and wherein a given one of the amplitude-based servo windows above a respective centerline of one of the tracks defines a different width relative to another given one of the amplitude-based servo windows below the respective centerline.

9. The data storage medium of claim 8, wherein the medium does not include any synchronization marks between the servo frames.

10. The data storage medium of claim 1, wherein each of the tracks in the first servo band defines a centerline that travels between at least two of the amplitude-based servo windows in the first set, and wherein a first subset of the amplitude-based servo windows in the first set is arranged differently with respect to a first centerline than a second subset of the amplitude-based servo windows in the first set with respect to a second centerline.

11. The data storage medium of claim 1, wherein the data storage medium comprises magnetic tape.

12. A system comprising:
 a data storage medium comprising a first servo band including a first set of amplitude-based servo windows, wherein the first set of amplitude-based servo windows defines a first set of servo tracks in the first servo band, and a second servo band including a second set of amplitude-based servo windows, wherein the second set of amplitude-based servo windows define a second set of servo tracks in the second servo band, wherein the second set amplitude-based servo windows is arranged differently than the first set of amplitude-based servo windows;
 a first head to pass relative to a given one of the servo tracks in the first servo band;
 a second head to pass relative to a corresponding one of the tracks in the second servo band; and
 a controller to determine whether the first and second heads are positioned on-track based on amplitudes of signals detected by the heads.

13. The system of claim 12, wherein the controller determines a track identification associated with the given track and the corresponding track based on the signals detected by the heads.

14. The system of claim 12, wherein the data storage medium is magnetically recorded with a signal and the first and second sets of amplitude-based servo windows comprise erase windows where the magnetically recorded signal has been erased from the data storage medium.

15. The system of claim 12, wherein the medium does not include any track identification marks between servo frames of the servo bands.

16. The system of claim 12, wherein the data storage medium comprises magnetic tape.

17. A method comprising:
 recording a first set of amplitude-based servo windows on a magnetic medium to define a first servo band including a first set of servo tracks; and
 recording a second set of amplitude-based servo windows on a magnetic medium to define a second servo band including a second set of servo tracks, wherein the second set of amplitude-based servo windows is arranged differently than the first set of amplitude-based servo windows.

18. The method of claim 17, further comprising:
 recording the first set of amplitude-based servo windows to define a checkerboard-like configuration; and
 recording the second set of amplitude-based servo windows to define a stepped configuration.

19. The method of claim 17, further comprising:
 recording the first set of amplitude-based servo windows to define an upward stepped configuration relative to a traverse direction of the medium; and
 recording the second set of amplitude-based servo windows to define a downward stepped configuration relative to the traverse.

20. The method of claim 17, wherein recording the first and second sets of amplitude-based servo windows comprises recording a signal on the magnetic medium and selectively erasing the signal to define the first and second sets of amplitude-based servo windows.

21. A method comprising:
 detecting a first servo signal along a servo track of a first servo band based on amplitude-based servo windows in the first servo band;
 detecting a second servo signal along a corresponding servo track of a second servo band based on amplitude-based servo windows in the second servo band, wherein the amplitude-based servo windows in the second servo band are arranged differently than the amplitude-based servo windows in the first servo band; and
 identifying the servo track based on the first and second servo signals.

22. The method of claim 21, further comprising generating position error signals based on at least one of the first and second servo signals.

23. The method of claim 22, further comprising adjusting positioning of one or more heads relative to the magnetic medium based on the position error signals.

\* \* \* \* \*